United States Patent
Hu

(10) Patent No.: US 11,743,556 B2
(45) Date of Patent: Aug. 29, 2023

(54) CHARACTER STRING DISPLAY PROCESSING METHOD AND APPARATUS, TERMINAL, AND STORAGE MEDIUM

(71) Applicant: TENCENT TECHNOLOGY (SHENZHEN) COMPANY LIMITED, Shenzhen (CN)

(72) Inventor: Li Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 147 days.

(21) Appl. No.: 17/491,401

(22) Filed: Sep. 30, 2021

(65) Prior Publication Data
US 2022/0021949 A1 Jan. 20, 2022

Related U.S. Application Data

(63) Continuation of application No. PCT/CN2020/112075, filed on Aug. 28, 2020.

(30) Foreign Application Priority Data

Aug. 28, 2019 (CN) .......................... 201910804833.6

(51) Int. Cl.
*H04N 21/81* (2011.01)
*H04N 21/431* (2011.01)
(Continued)

(52) U.S. Cl.
CPC ..... *H04N 21/8146* (2013.01); *H04N 21/4316* (2013.01); *H04N 21/4788* (2013.01); *H04N 21/4882* (2013.01)

(58) Field of Classification Search
CPC ........... H04N 21/8146; H04N 21/4316; H04N 21/4788; H04N 21/4882
See application file for complete search history.

(56) References Cited

U.S. PATENT DOCUMENTS 10,445,425 B2 * 10/2019 Jon .................. G06F 40/274
2015/0372963 A1 * 12/2015 Root .................. H04L 51/42
709/206
(Continued)

FOREIGN PATENT DOCUMENTS

CN 102074221 A 5/2011
CN 107038017 A 8/2017
(Continued)

OTHER PUBLICATIONS

The World Intellectual Property Organization (WIPO) International Search Report for PCT/CN2020/112075 dated Nov. 25, 2020 5 Pages (including translation).
(Continued)

*Primary Examiner* — Kyu Chae
(74) *Attorney, Agent, or Firm* — Anova Law Group PLLC

(57) ABSTRACT

A character string display processing method is provided. The method includes: receiving a character display instruction; performing, in response to determining a target character string in the character string set does not include a character of a preset type, first rendering preprocessing on a target character included in the target character string to obtain a first rendered data set, and generating a rendering instruction about the character string set according to the first rendered data set; and performing, in response to determining the target character string includes a character of a preset type, second rendering preprocessing on the target character string to obtain a second rendered data set, and generating a rendering instruction about the character string set according to the second rendered data set.

20 Claims, 16 Drawing Sheets

(51) Int. Cl.
*H04N 21/4788* (2011.01)
*H04N 21/488* (2011.01)

(56) References Cited

U.S. PATENT DOCUMENTS

2019/0034768 A1    1/2019   Nakahara
2019/0288965 A1*   9/2019   Qiu ..................... H04L 51/046

FOREIGN PATENT DOCUMENTS

| CN | 108805960 A | 11/2018 |
| CN | 109948581 A | 6/2019 |

OTHER PUBLICATIONS

Romain Guy, "Android's Font Renderer Efficient text rendering with OpenGL ES," Medium. com, May 18, 2014. Retrieved from the Internet:URL: https://medium.com/@romainguy/androids-font-renderer-c368bbde87d9 [retrieved on Sep. 29, 2021]. 10 pages.

* cited by examiner

| | | |
|---|---|---|
| C N |  | U+1F1F8<br>U+1F1F3 |
| J P |  | U+1F1FF<br>U+1F1F5 |
| K R |  | U+1F1F0<br>U+1F1F7 |

Laughing emoji     Crying emoji     Shield image

CHARACTER STRING DISPLAY PROCESSING METHOD AND APPARATUS, TERMINAL, AND STORAGE MEDIUM

RELATED APPLICATION

This application is a continuation application of PCT Patent Application No. PCT/CN2020/112075, filed on Aug. 28, 2020, which claims priority to Chinese Patent Application No. 201910804833.6, filed on Aug. 28, 2019 and entitled "CHARACTER STRING DISPLAY PROCESSING METHOD AND APPARATUS, TERMINAL, AND STORAGE MEDIUM", all of which are incorporated herein by reference in entireties.

FIELD OF THE TECHNOLOGY

The present disclosure relates to the field of Internet technologies, and in particular, to a character string display processing method and apparatus, a terminal, and a storage medium.

BACKGROUND

With the development of science and technology, new functions have been imparted onto various applications to improve user experience. For example, many applications may display some content on a user interface (UI) in a floating manner to attract a user's attention. For example, a bullet comment function is developed in a video application, so that the user may comment on a video by using a client device while watching the video. Comments posted by the user are displayed on a video screen in real time, or the user may view other users' comments on the video that are displayed on the video screen. In another example, content such as advertisement content and a website instruction on a website that requires the user's special attention is displayed on a page of the website in a floating manner.

SUMMARY

Embodiments of the present disclosure provide a character string display processing method and apparatus, a terminal, and a storage medium, so that target character strings of different types of characters may be rendered in targeted manners, thereby better displaying the target character strings on a UI of a terminal in a floating manner.

In one aspect, the present disclosure provides a character string display processing method, including: receiving a character display instruction, the character display instruction being used for instructing to render a character string set; performing, when or in response to determining a target character string in the character string set does not include a character of a preset type, first rendering preprocessing on a target character included in the target character string to obtain a first rendered data set, the first rendered data set including a target character image corresponding to the target character, and generating a rendering instruction about the character string set according to the first rendered data set to instruct to perform image rendering on the target character image; and performing, when or in response to determining a target character string in the character string set includes a character of a preset type, second rendering preprocessing on the target character string to obtain a second rendered data set, the second rendered data set including a character string image corresponding to the target character string, and generating a rendering instruction about the character string set according to the second rendered data set to instruct to perform image rendering on the character string image.

In another aspect, the present disclosure provides a character string display processing apparatus, the apparatus including: a memory storing computer program instructions; and a processor coupled to the memory and configured to execute the computer program instructions and perform: receiving a character display instruction, the character display instruction being used for instructing to render a character string set; performing, when or in response to determining a target character string in the character string set does not include a character of a preset type, first rendering preprocessing on a target character included in the target character string to obtain a first rendered data set, the first rendered data set including a target character image corresponding to the target character, and generate a rendering instruction about the character string set according to the first rendered data set to instruct to perform image rendering on the target character image; performing, when or in response to determining a target character string in the character string set includes a character of a preset type, second rendering preprocessing on the target character string to obtain a second rendered data set, the second rendered data set including a character string image corresponding to the target character string, and generate a rendering instruction about the character string set according to the second rendered data set to instruct to perform image rendering on the character string image.

In yet another aspect, the present disclosure provides a non-transitory computer-readable storage medium storing computer program instructions executable by at least one processor to perform: receiving a character display instruction, the character display instruction being used for instructing to render a character string set; performing, in response to determining a target character string in the character string set does not include a character of a preset type, first rendering preprocessing on a target character included in the target character string to obtain a first rendered data set, the first rendered data set including a target character image corresponding to the target character, and generating a rendering instruction about the character string set according to the first rendered data set to instruct to perform image rendering on the target character image; and performing, in response to determining the target character string in the character string set includes the character of the preset type, second rendering preprocessing on the target character string to obtain a second rendered data set, the second rendered data set including a character string image corresponding to the target character string, and generating a rendering instruction about the character string set according to the second rendered data set to instruct to perform image rendering on the character string image.

In yet another aspect, the present disclosure provides a terminal, including: a processor, suitable for implementing one or more instructions; and a computer storage medium, storing one or more instructions, the one or more instructions being suitable to be loaded by the processor to perform the following operations: receiving a character display instruction, the character display instruction being used for instructing to render a character string set; performing, when or in response to determining a target character string in the character string set does not include a character of a preset type, first rendering preprocessing on a target character included in the target character string to obtain a first rendered data set, the first rendered data set including a target character image corresponding to the target character, and generating a rendering instruction about the character string set according to the first rendered data set to instruct to perform image rendering on the target character image; and performing, when or in response to determining a target character string in the character string set includes a character of a preset type, second rendering preprocessing on the target character string to obtain a second rendered data set, the second rendered data set including a character string image corresponding to the target character string, and generating a rendering instruction about the character string set according to the second rendered data set to instruct to perform image rendering on the character string image.

In the embodiments of the present disclosure, for whether a target character string includes a character of a preset type, a first rendered data set and a second rendered data set are obtained in different rendering preprocessing manners, and further a rendering instruction about a character string set is generated according to the first rendered data set or the second rendered data set, thereby implementing different rendering according to different types of characters included in the target character string. Compared with using the same processing method for all target character strings, the target character strings can be displayed more effectively.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

Figure 2:
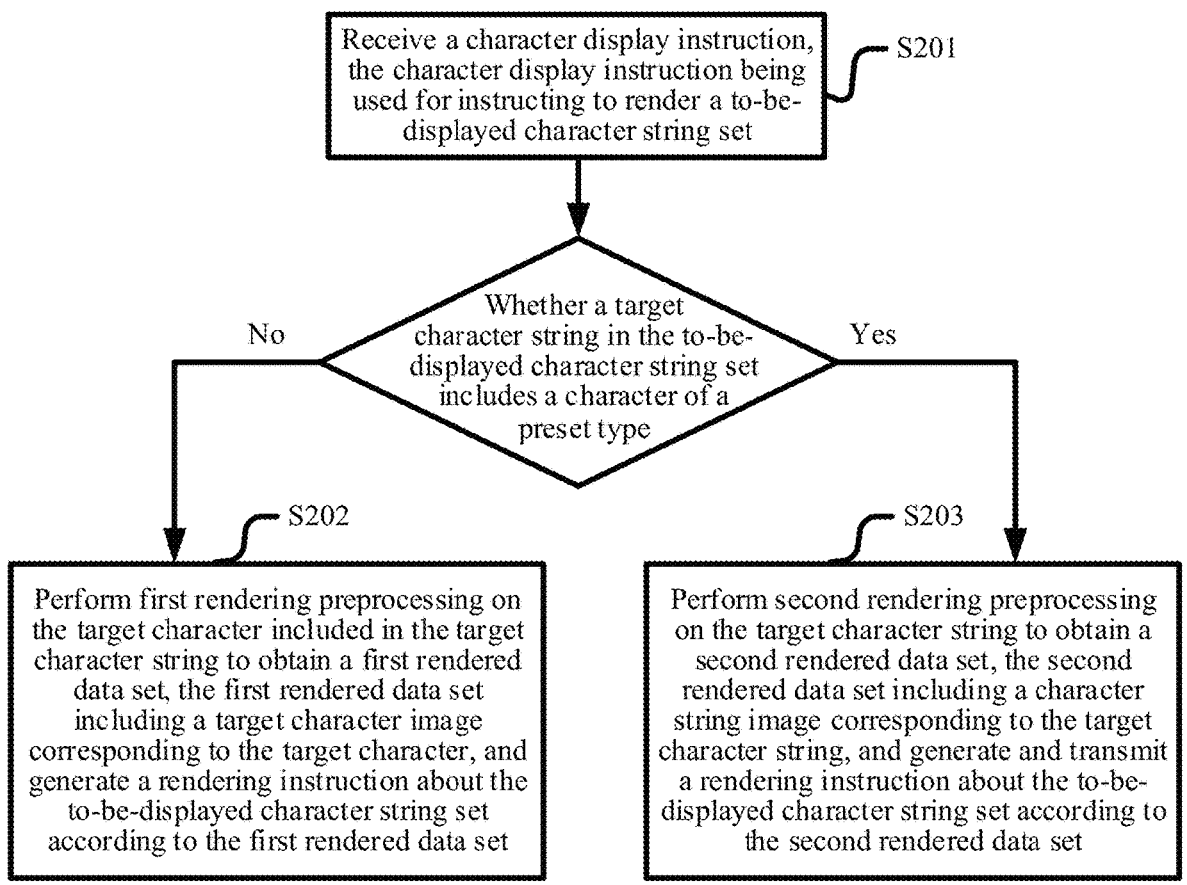
Figure 3A:
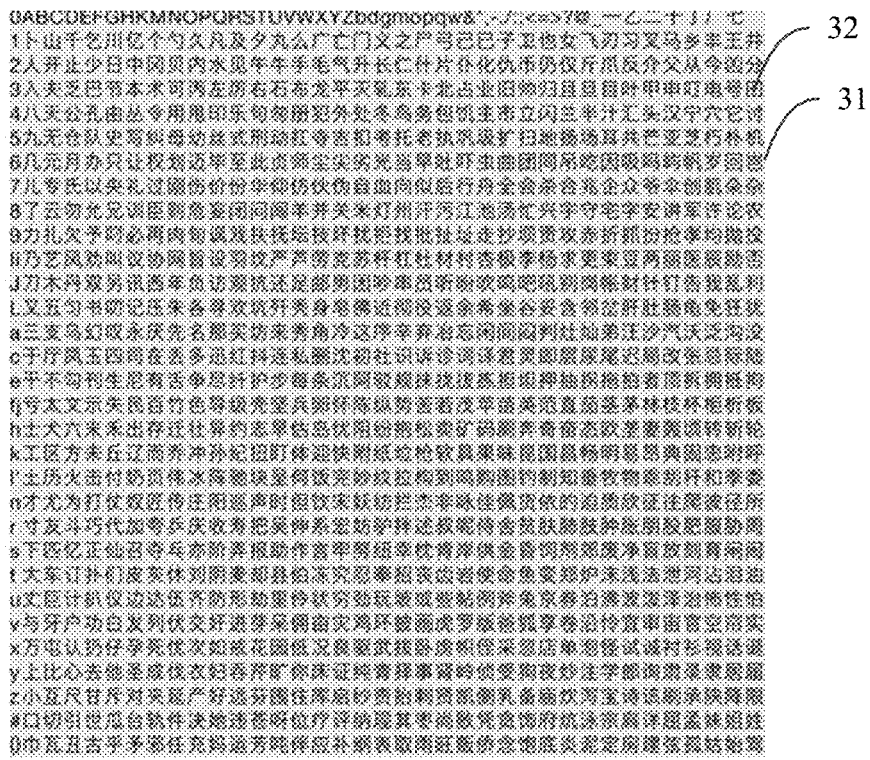
Figure 3B:
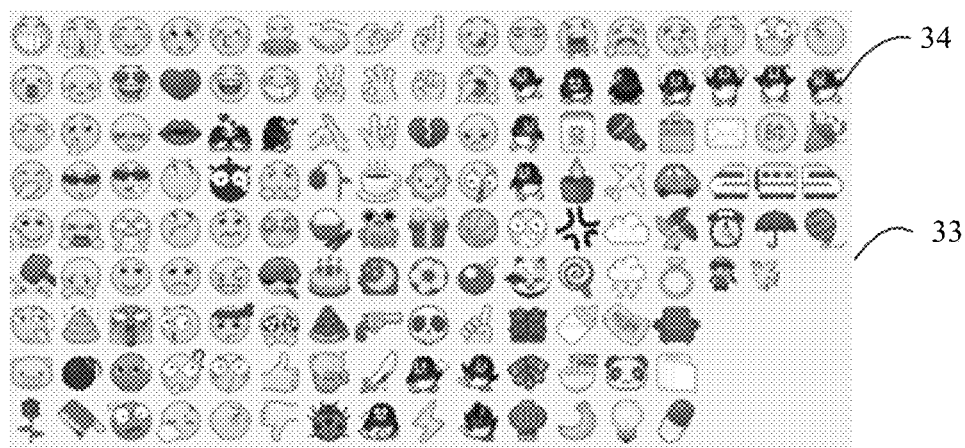
Figure 3C:
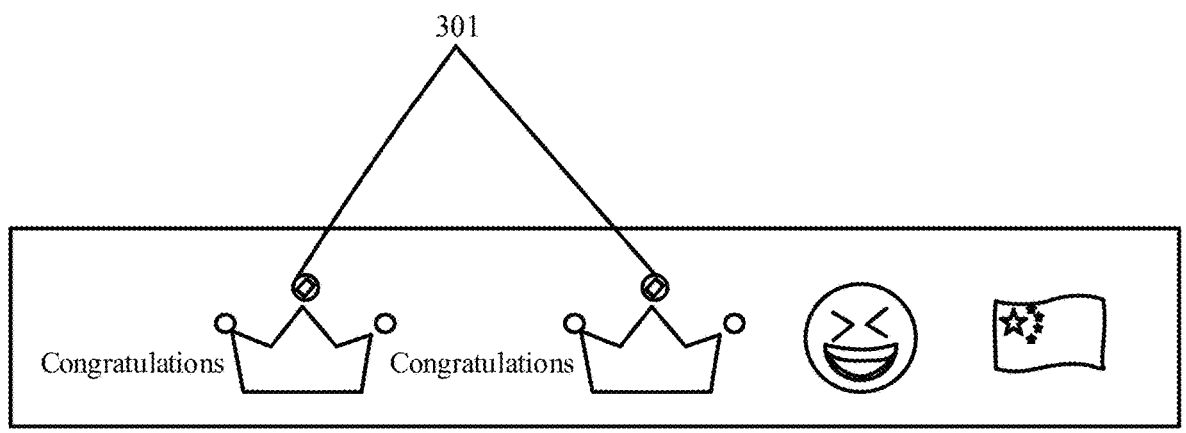
Figure 3D:
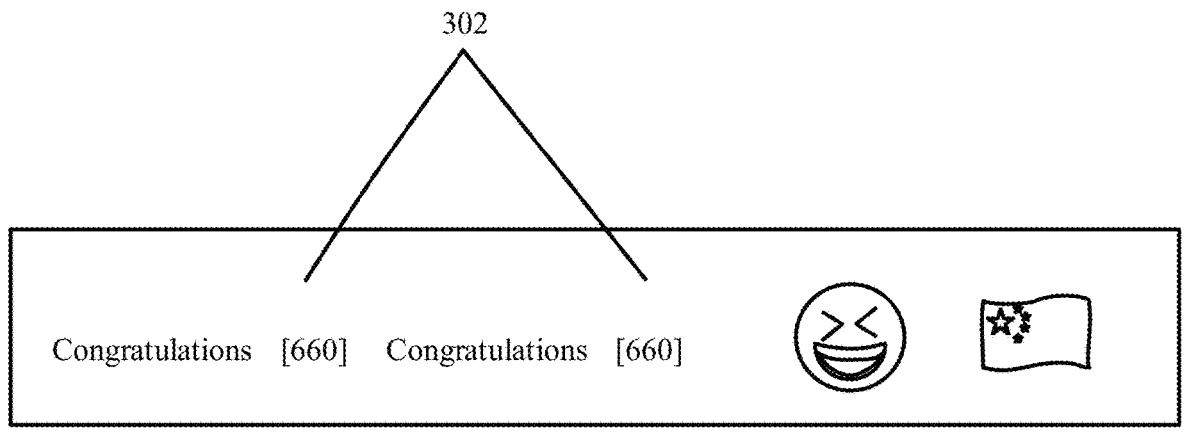
Figure 3E:
Figure 3E:
Figure 3E:
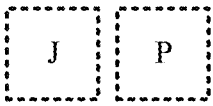
Figure 4A:
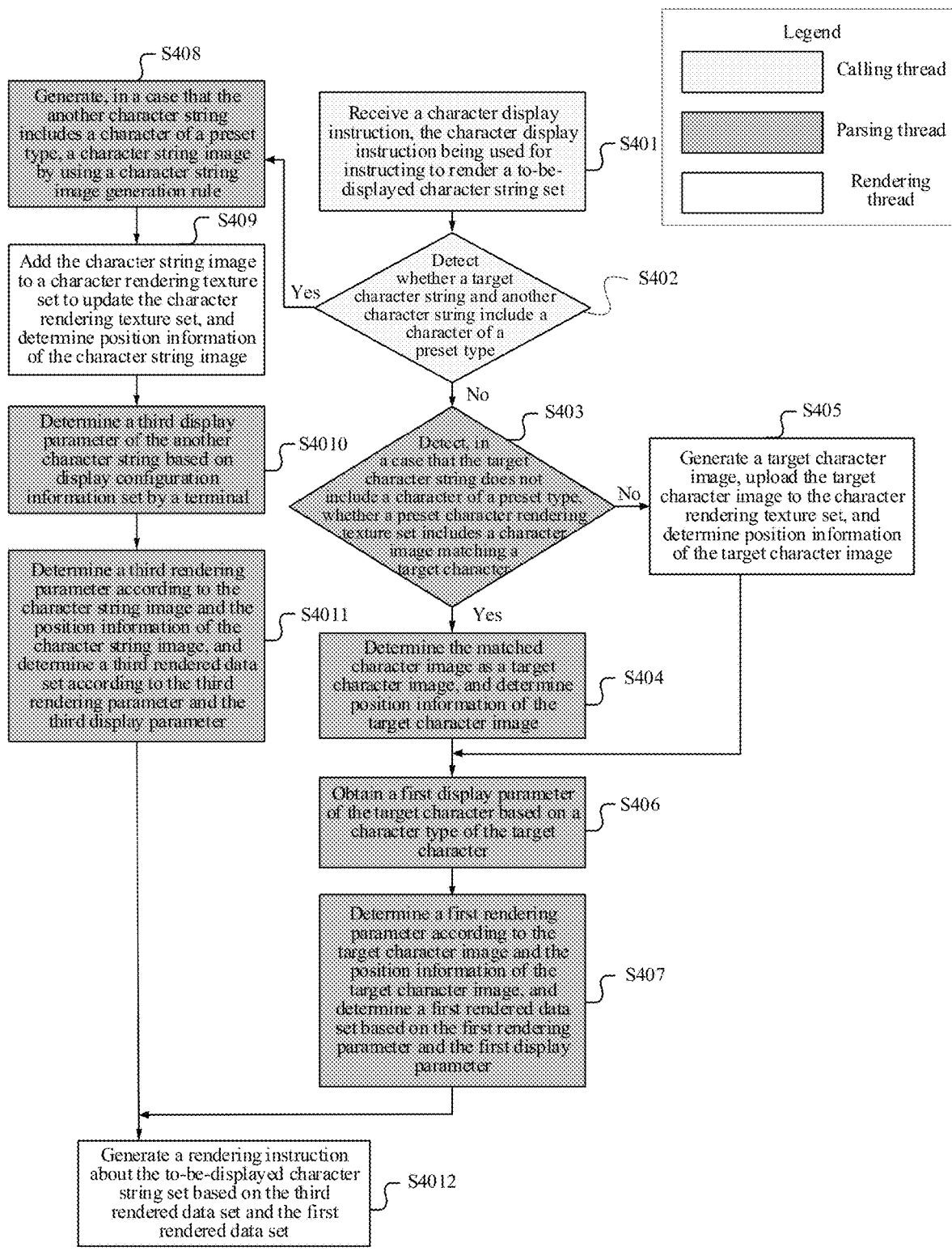
Figure 4B:
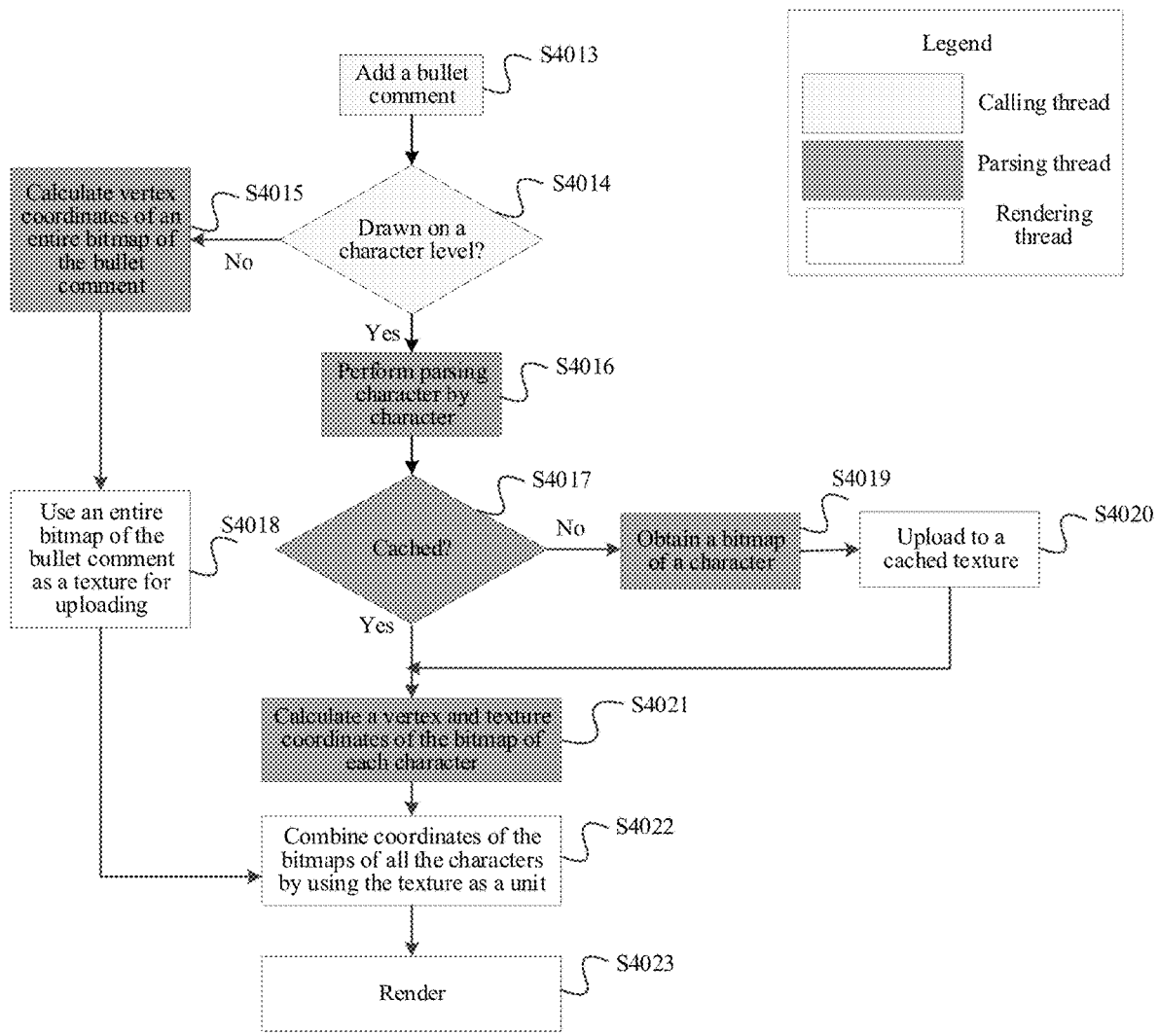
Figure 5A:
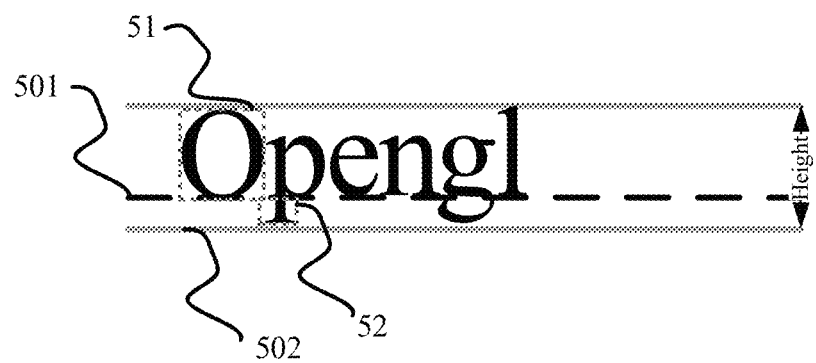
Figure 5B:
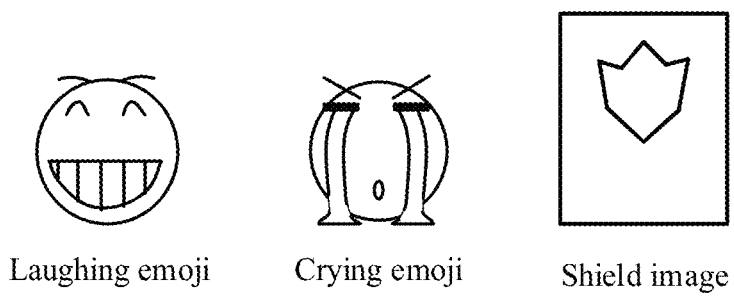
Figure 5C:
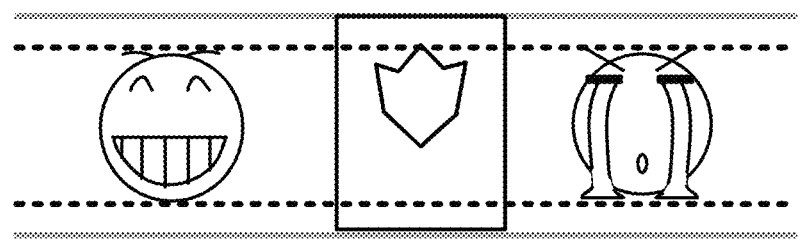
Figure 5D:
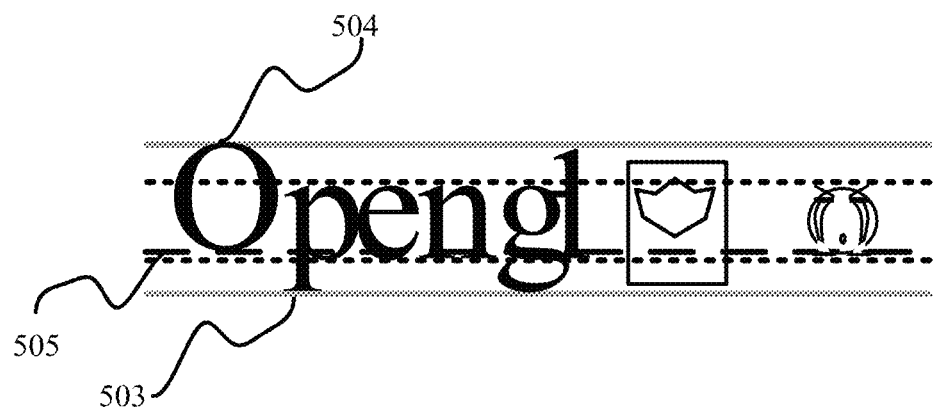
Figure 5E:
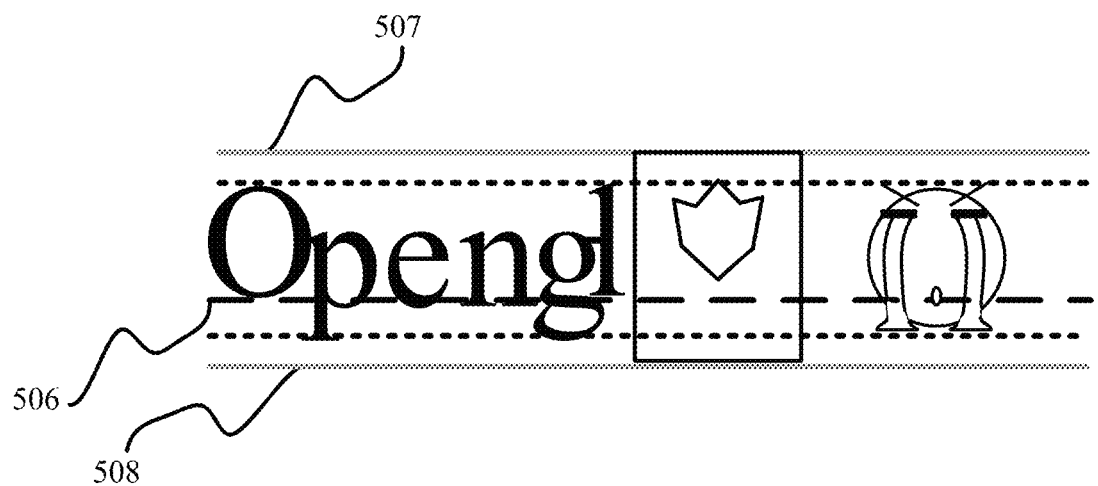
Figure 6:
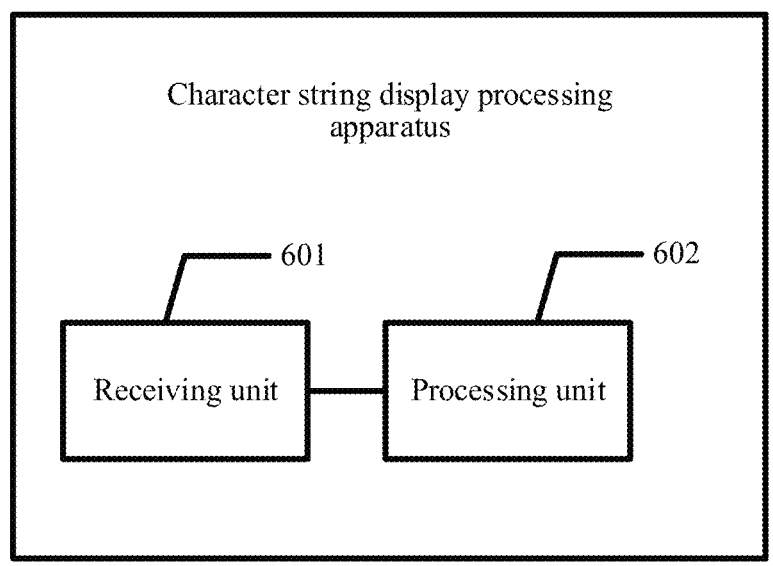
Figure 7:
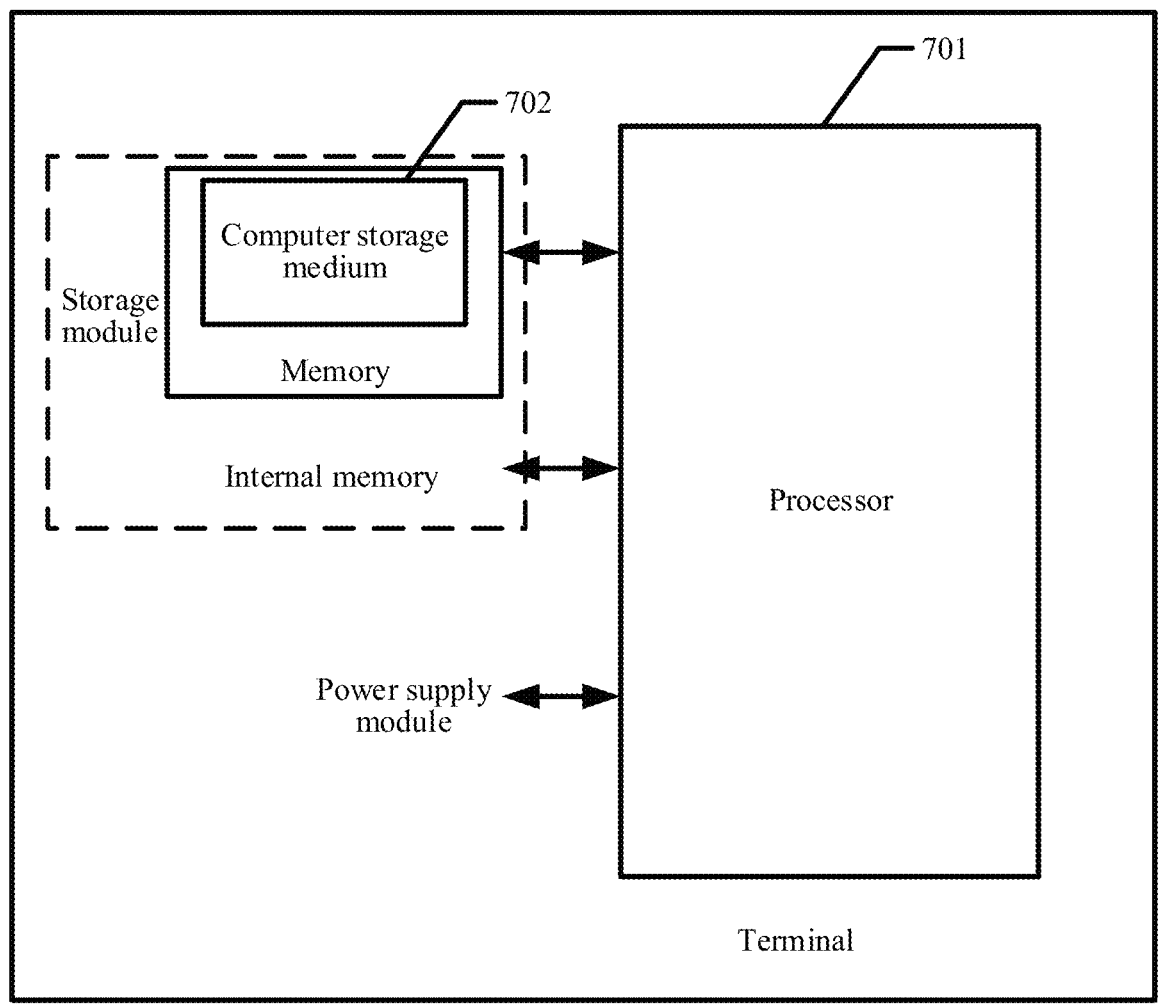

FIG. if is a schematic diagram of displaying a character string on a UI according to one or more embodiments of the present disclosure;

FIG. 2 is a schematic flowchart of a character string display processing method according to one or more embodiments of the present disclosure;

FIG. 3a is a schematic diagram of a character rendering texture set according to one or more embodiments of the present disclosure;

FIG. 3b is a schematic diagram of another character rendering texture set according to one or more embodiments of the present disclosure;

FIG. 3c is a schematic diagram of a character rendering according to one or more embodiments of the present disclosure;

FIG. 3d is a schematic diagram of another character rendering according to one or more embodiments of the present disclosure;

FIG. 3e is a schematic diagram of storing character images according to one or more embodiments of the present disclosure;

FIG. 4a is a schematic flowchart of another character string display processing method according to one or more embodiments of the present disclosure;

FIG. 4b is a schematic flowchart of still another character string display processing method according to one or more embodiments of the present disclosure;

FIG. 5a is a schematic diagram of target character typesetting according to one or more embodiments of the present disclosure;

FIG. 5b is a schematic diagram of a target character according to one or more embodiments of the present disclosure;

FIG. 5c is a schematic diagram of another target character typesetting according to one or more embodiments of the present disclosure;

FIG. 5d is a schematic diagram of still another target character typesetting according to one or more embodiments of the present disclosure;

FIG. 5e is a schematic diagram of yet another target character typesetting according to one or more embodiments of the present disclosure;

FIG. 6 is a schematic structural diagram of a character string display processing apparatus according to one or more embodiments of the present disclosure; and FIG. 7 is a schematic structural diagram of a terminal according to one or more embodiments of the present disclosure.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

Some methods for displaying content on a UI (for example, on a UI for playing a video) in a floating manner may consume relatively high power consumption of the terminal in an actual implementation, and a phenomenon of video freezing tends to occur when a relatively large quantity of to-be-displayed character strings. Therefore, how to display a to-be-displayed character string on a UI of a terminal in a floating manner becomes a hot research issue at present.

The term "to-be-displayed character strings" may also be understood as "character strings," and the term "to-be-displayed character string set" may also be understood as "character string set." In certain embodiments, the term "to-be-recognized character strings" refers to characters strings displayed according to one or more steps illustratively shown in one or more of the accompanying drawings, and the term "to-be-recognized character string set" refers to a characters string set displayed according to one or more steps illustratively shown in one or more of the accompanying drawings.

An embodiment of the present disclosure provides a character string display processing solution, and the character string display processing solution may be applied to an implementation scenario of displaying a character string on a UI of a terminal in a floating manner. The displaying in a floating manner means to display some character strings in a manner of floating above content shown on a UI, for example, to cover a UI for playing a video with a view for displaying a character string. These character strings may be comment text, for example, a bullet comment, or may be advertising graphic on a website. The character string display processing solution may include: receiving a character display instruction, the character display instruction being used for instructing a terminal to render a character string set, to display the character string set on a UI of the terminal in a floating manner; performing, when or in response to determining a target character string in the character string set does not include a character of a preset type, first rendering preprocessing on a target character included in the target character string to obtain a first rendered data set, the first rendered data set including a target character image corresponding to the target character, and generating and transmitting a rendering instruction about the character string set according to the first rendered data set, the rendering instruction being used for instructing to perform image rendering on the target character image; and performing, when or in response to determining a target character string in the character string set includes a character of a preset type, second rendering preprocessing on the target character string to obtain a second rendered data set, the second rendered data set including a character string image corresponding to the target character string, and generating a rendering instruction about the character string set according to the second rendered data set to instruct to perform image rendering on the character string image.

By adopting the character string display processing solution provided in this embodiment of the present disclosure, different rendering preprocessing methods may be adopted for target character strings of different types of characters, and further a rendering instruction about a to-be-displayed character string set is generated according to different rendering preprocessing results for rendering. Compared with using the same rendering method for all character strings, the target character strings can be displayed more effectively.

Figure 1A:
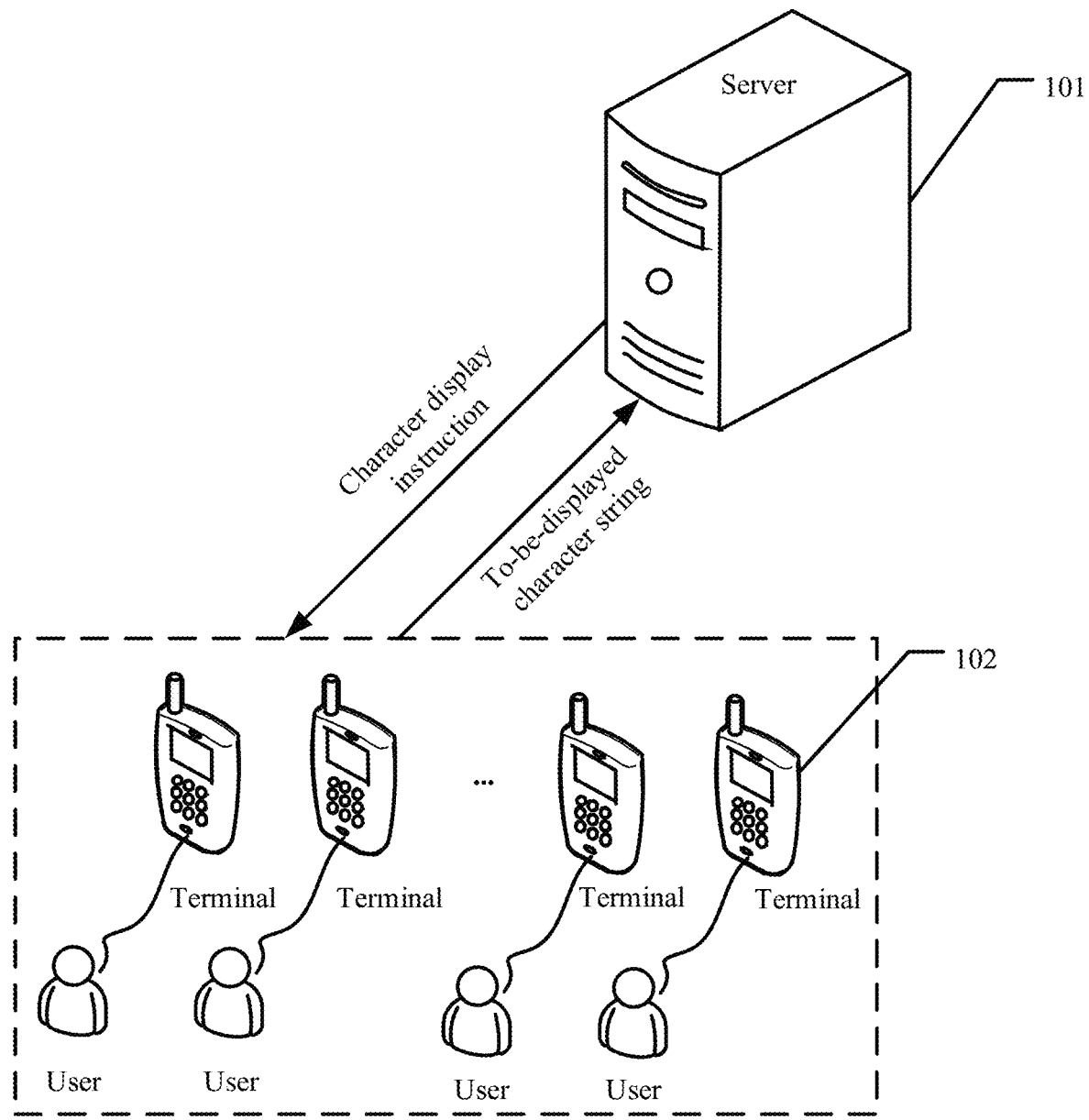
FIG. 1a is a schematic structural diagram of a character string display processing solution according to one or more embodiments of the present disclosure.

An example in which the character string display processing solution is used for adding a bullet comment to a video is used. FIG. 1a is a schematic structural diagram of a character string display processing solution according to an embodiment of the present disclosure. The schematic structural diagram shown in FIG. 1a may include a server 101 and at least one terminal 102. The terminal 102 may be a mobile phone, a tablet computer, a laptop computer, a wearable device, and the like. The server 101 may be a cloud server or a local server. The terminal 102 and the server 101 are connected to exchange information.

In an embodiment, the terminal 102 may be configured to play a video. For example, a video player configured to play a video may be installed in the terminal 102, and a user may watch a video by using the video player. Alternatively, the user may watch a video on a website by using the terminal 102. Data used for providing service support for a video service in the terminal 102 may be stored in the server 101.

Figure 1B:
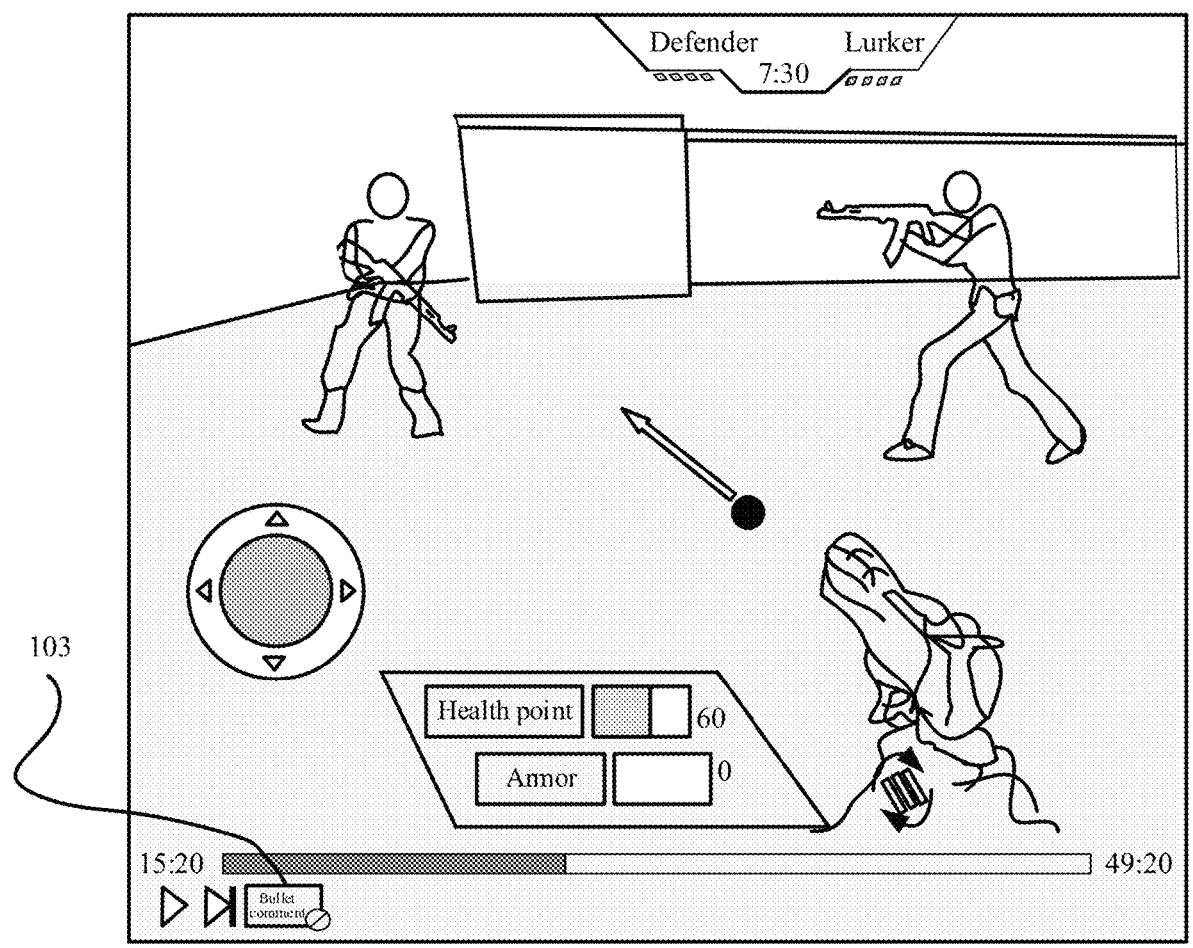
FIG. 1b is a schematic diagram of a UI of a terminal according to one or more embodiments of the present disclosure.
Figure 1C:
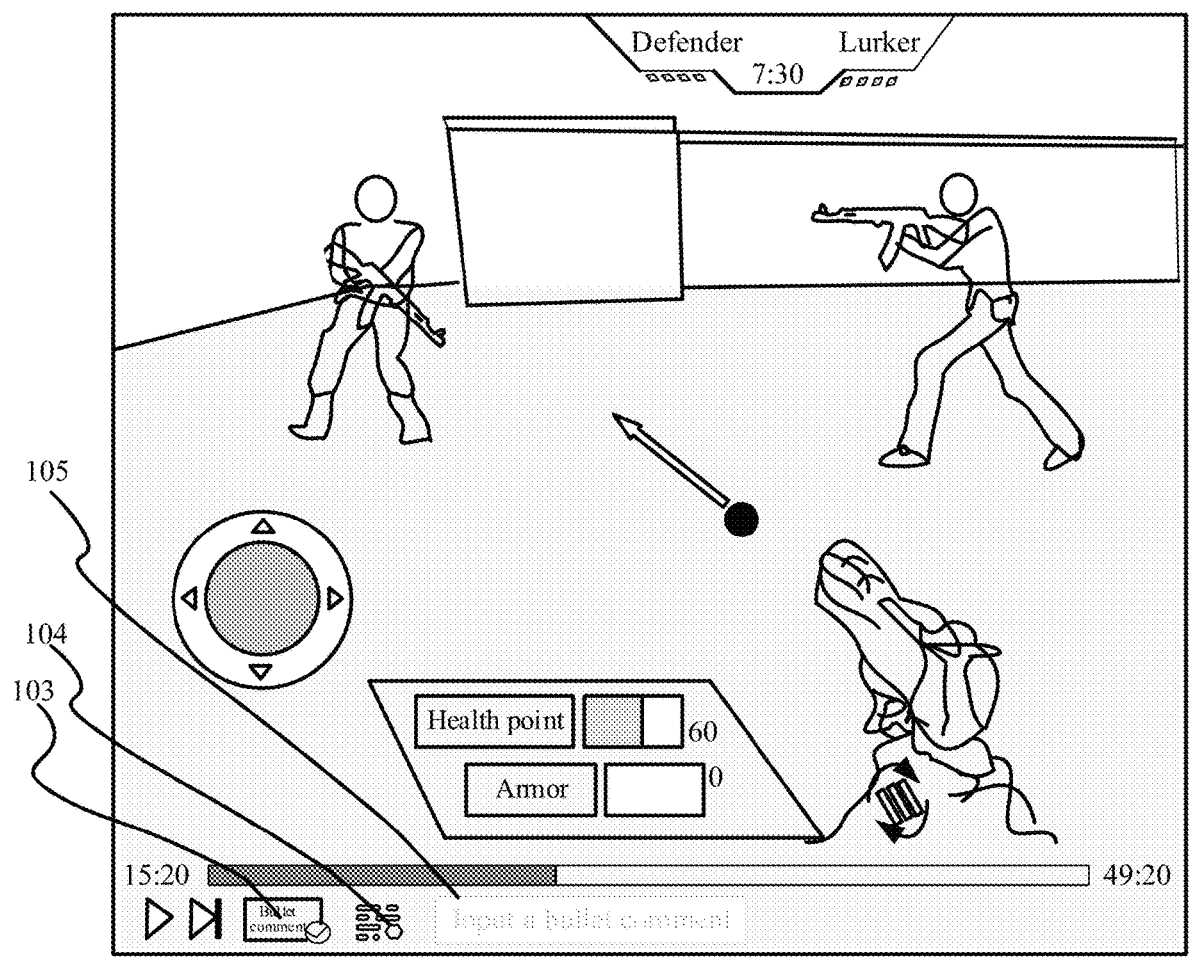
FIG. 1c is a schematic diagram of a UI of another terminal according to one or more embodiments of the present disclosure.

In an embodiment, when playing a video, the terminal 102 may display a bullet comment option used for adding a bullet comment on a UI of the played video. The user may trigger the bullet comment option, so that the terminal 102 displays an input box that may receive a text input, an interface that may receive a voice input, or the like on the UI of the played video, for the user to input bullet comment content, that is, a character string, that the user wants to add by using a keyboard or a microphone. The terminal 102 transmits a character string set to the server 101. For example, a user A watches a video by using a terminal 102. FIG. 1b and FIG. 1c show a UI of a video played by a terminal according to an embodiment of the present disclosure. It is assumed that the played video is a game video. The UI may include a bullet comment button 103. If the bullet comment button 103 is in a state shown in FIG. 1b, it represents that the user A has disabled a bullet comment function, that is, bullet comments added to the video by other users watching the video are not displayed on the UI, and the user A cannot add a bullet comment to the UI. If the bullet comment button 103 is in a state shown in FIG. 1c, it represents that the user A has enabled the bullet comment function, that is, bullet comments added to the video by all users watching the video are displayed on the UI, and the user A can add a bullet comment to the UI.

Figure 1D:
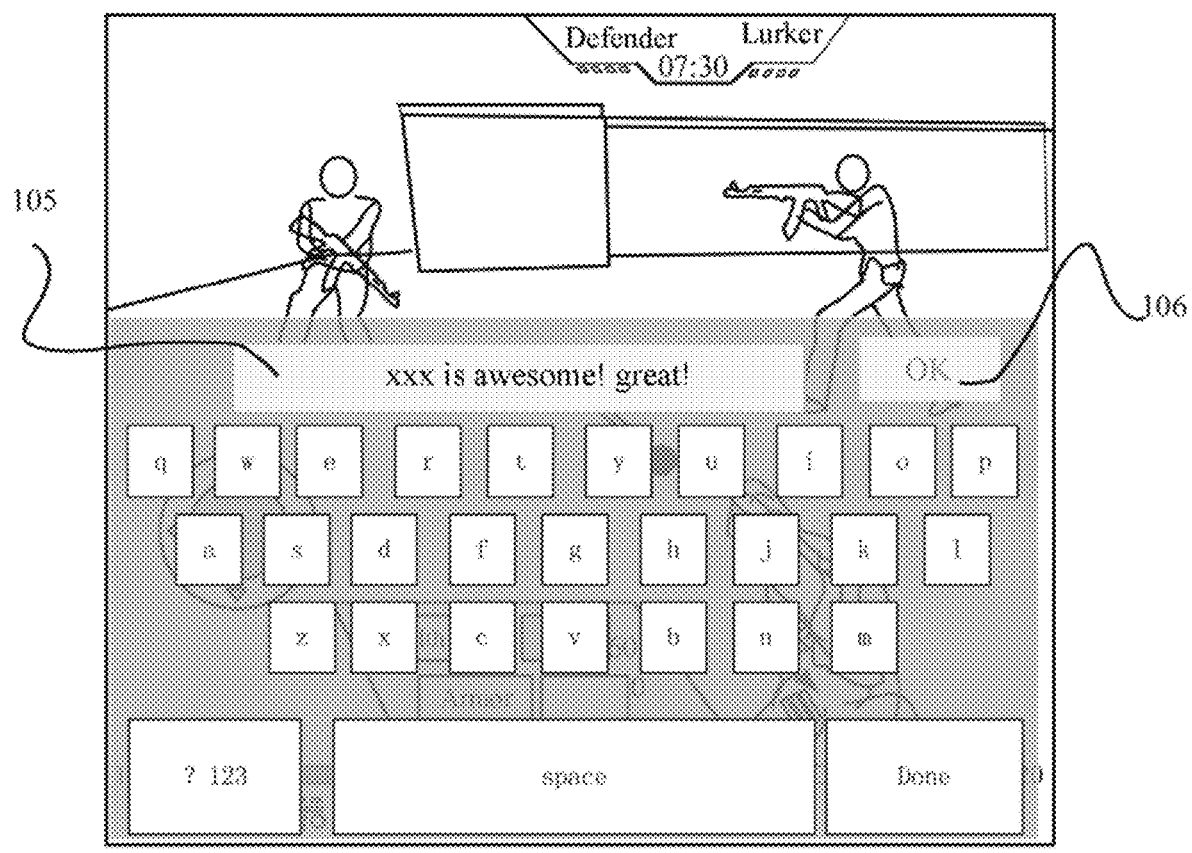
FIG. 1d is a schematic diagram of a UI of still another terminal according to one or more embodiments of the present disclosure.

Assuming that on the UI shown in FIG. 1c, when the user A has enabled the bullet comment function, the UI further includes a bullet comment setting button 104 and a bullet comment input box 105. If the user A taps the bullet comment setting button 104, the terminal shows a bullet comment setting interface. The bullet comment setting interface may include a character font size of a bullet comment, a quantity of bullet comments, and a color of a bullet comment. If the user A performs a bullet comment input operation in the bullet comment input box 105, the terminal shows a keyboard for the user to input bullet comment content into the bullet comment input box by using the keyboard. For example, according to this embodiment of the present disclosure, an interface of the terminal for showing a keyboard may further include an OK button 106. After the OK button 106 is tapped, the terminal 102 transmits a character string in the bullet comment input box 105 to the server 101. It is assumed that the user A taps the bullet comment input box 105, and a keyboard shown by the terminal is shown in FIG. 1d. The user A inputs "xxx is awesome! great!" into the bullet comment input box 105 shown in FIG. 1d, and taps the OK button 106.

Figure 1E:
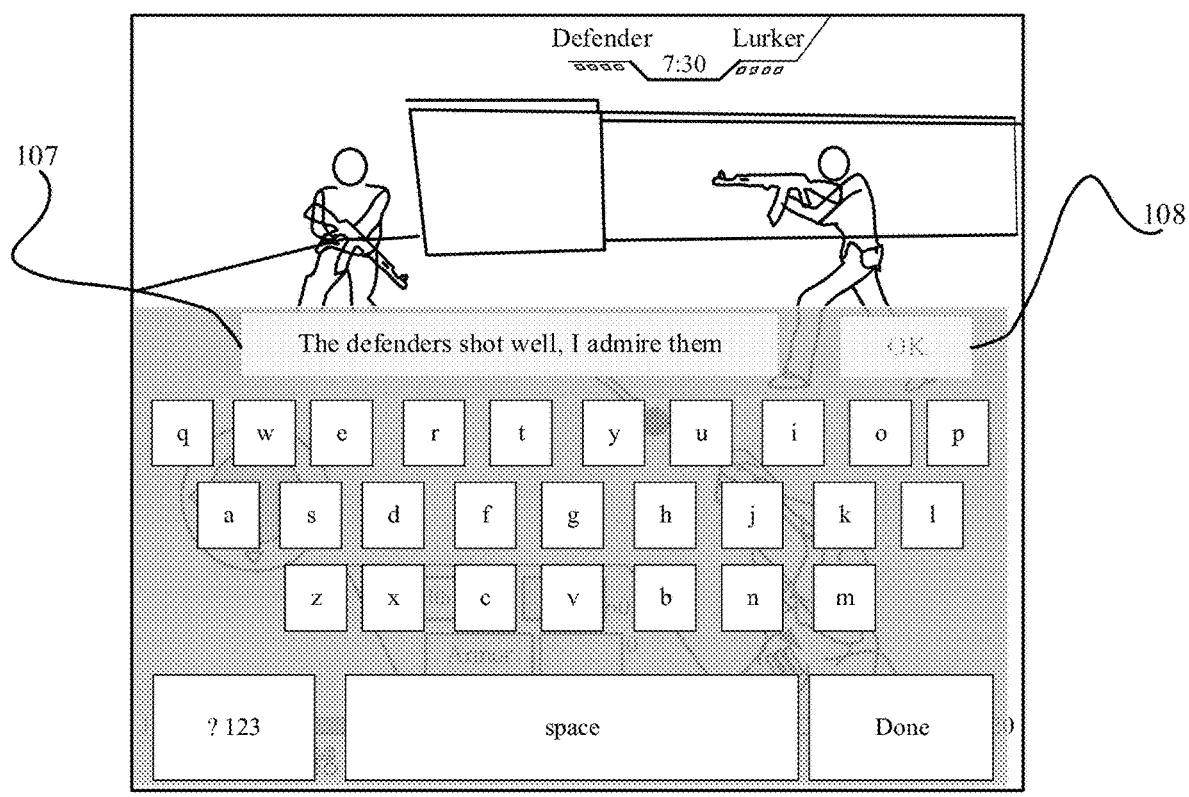
FIG. 1e is a schematic diagram of a UI of yet another terminal according to one or more embodiments of the present disclosure.

In an embodiment, because a plurality of users may watch one same video by using a plurality of different terminals 102, if the plurality of users input character strings by using respective terminals 102, the server 101 receives a plurality of character strings at this time. For example, it is assumed that a user B watches the video by using a terminal 102 different from that of the user A. FIG. 1e shows a UI of adding a bullet comment to the terminal 102 corresponding to the user B. Similarly, FIG. 1e further includes a bullet comment input box 107 and an OK button 108, and it is assumed that the user B inputs "The defenders shot well, I admire them" into the bullet comment input box 107 shown in FIG. 1e and taps the OK button 108.

In this implementation, the terminal 102 corresponding to the user A and the terminal 102 corresponding to the user B transmit the character strings in the respective bullet comment input boxes to the server 101.

In an embodiment, the server 101 may set a preset time range according to video content, collect character strings within the preset time range, organize the character strings into a character string set, add the character string set to a character display instruction, and transmit the character display instruction to all terminals 102 of users watching the same video at a current moment. Then the server 101 continues to collect a plurality of character strings within a next preset time range. That is, the server 101 collects character strings periodically and transmits the character strings to the terminals 102. A character string set received by the terminal 102 corresponding to the user A includes a character string inputted by the user A by using the bullet comment input box 105, and further includes a character string inputted by the user B by using the bullet comment input box 107.

Figure 1F:
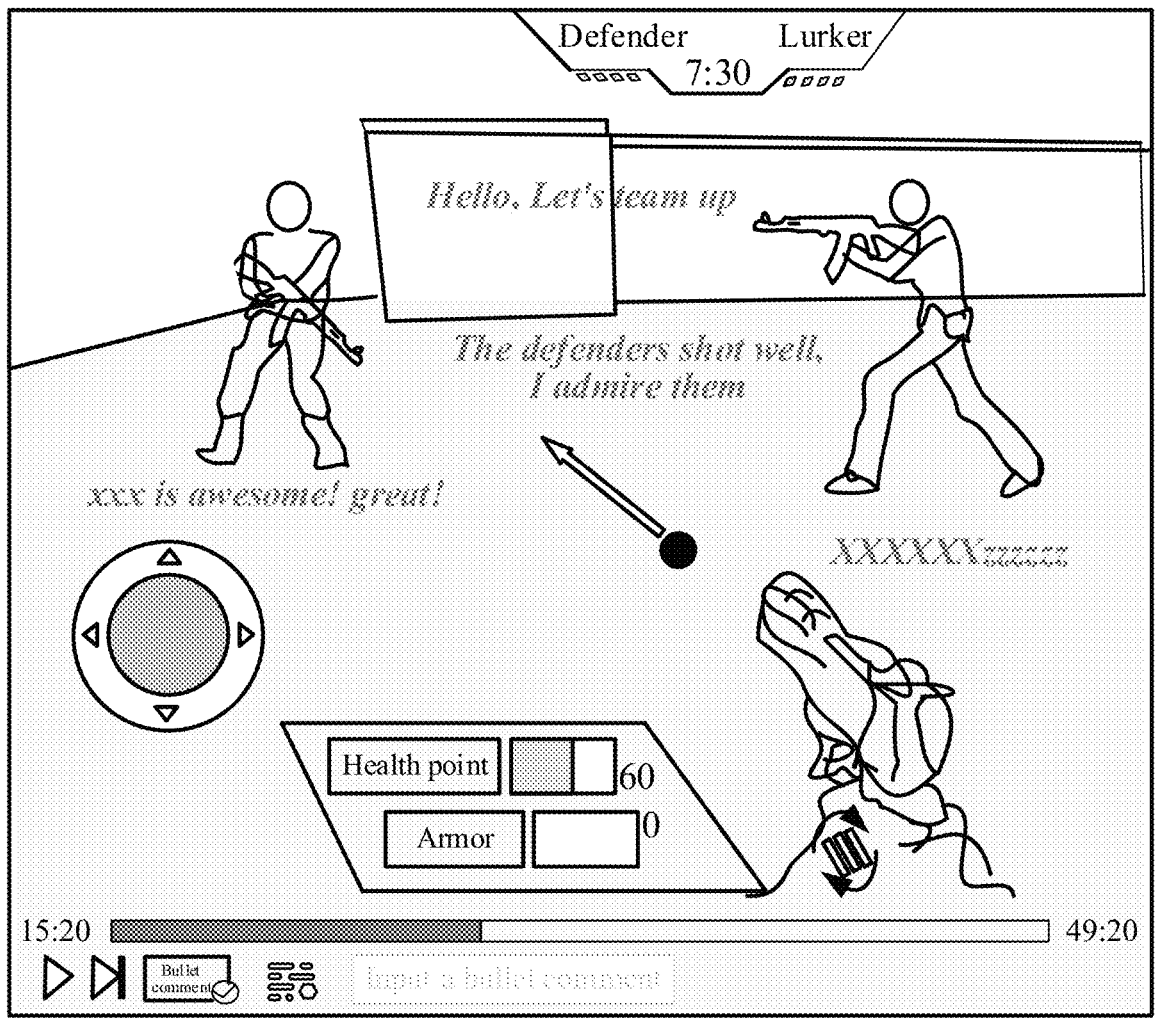

After receiving the character display instruction transmitted by the server 101, the terminal 102 performs the foregoing character string display processing solution, to display each character string in the character string set collected by each terminal 102 on the UI of the terminal. For example, after the terminal 102 corresponding to the user A performs the foregoing character string display processing solution, a character string set displayed on the UI presented on a display may be shown in FIG. 1f. As can be seen in FIG. 1f, both "xxx is awesome! great!" inputted by the user A into the bullet comment input box 105 and "The defenders shot well, I admire them" inputted by the user B into the bullet comment input box 107 are included.

Based on the foregoing descriptions, an embodiment of the present disclosure provides a schematic flowchart of a character string display processing method, as shown in FIG. 2. The character string display processing method described in FIG. 2 may be performed by a terminal, and may be performed by a processor of the terminal. The character string display processing method shown in FIG. 2 may include the following steps:

Step S201: Receive a character display instruction, the character display instruction being used for instructing to render a character string set.

In an embodiment, the character display instruction received by the terminal may be transmitted by a server. For example, in an implementation scenario of adding a bullet comment to a video, when detecting corresponding bullet comment addition operations (for example, as shown in FIG. 1d and FIG. 1f) inputted by users, terminals playing videos transmit collected bullet comment content (that is, character strings) to the server. The server obtains a character string set according to the character strings transmitted by the terminals, generates a character display instruction carrying the character string set, and transmits the character display instruction to the terminals, for the terminals to render the character string set and display the character string set on UIs playing videos.

The character string set may include one or more character strings, and it is assumed that a target character string is any character string in the character string set. For example, the one or more character strings are associated with one or more user accounts or user terminals. For ease of description, the target character string in the character string set is used as an example in the following to describe the character string display processing method in this embodiment. Other character strings than the target character string in the character string set may also adopt the same processing method as that of the target character string.

Step S202: Perform, when or in response to determining a target character string in the character string set does not include a character of a preset type, first rendering preprocessing on a target character included in the target character string to obtain a first rendered data set, the first rendered data set including a target character image corresponding to the target character, and generate a rendering instruction about the character string set according to the first rendered data set. The rendering instruction is a rendering instruction used for instructing to perform image rendering on the target character image. When or in response to determining there are bullet comments, step S202 is to perform character level rendering on the bullet comments.

For example, according to this embodiment of the present disclosure, after generating the rendering instruction about the character string set according to the first rendered data set, the terminal transmits the rendering instruction to a rendering engine, for the rendering engine to perform the rendering instruction, that is, to perform image rendering on the target character image, so as to display the target character string on a UI (for example, a UI playing a video) displayed by a display of the terminal. In certain embodiments, character types included in character strings in the character string set are generally different, and processing methods and procedures for different types of characters are also different. If the same method is adopted to render all character strings in the character string set, rendering of a character string including special or relatively complex characters may be relatively slow, which affects display efficiency of the character string. The character type may include a text type, an image type, and other types. A character of a text type is displayed as a character on the UI, and a character of an image type is displayed as an image on the UI. Other types of characters are generally relatively special or complex text or images.

Based on this, to better display a character string and improve display efficiency of the character string, according to this embodiment of the present disclosure, characters of some preset types are preset, and a character string including a character of a preset type and a character string including no character of a preset type are rendered in targeted manners. According to this embodiment of the present disclosure, for example, the character of the preset type may be a character with relatively low reusability. When the reusability is relatively low, it means that a possibility of occurrence of the character in a next bullet comment is relatively low. For example, some characters that can only be transmitted by a user who has signed up for super membership or some characters that can only be transmitted by a user whose watching duration is longer than a preset time are characters with relatively low reusability. The character of the preset type described in this embodiment of the present disclosure may also be other types of characters.

In an embodiment, the terminal may determine the preset type according to a display processing history of the character string. For example, in several character string display processing processes, it is found that it takes a relatively long time to process a character during display processing of a character string including the character, a probability of occurrence of the character in a next character string display processing process is relatively low, and a character type corresponding to the character may be set to a preset type.

In other embodiments, a character of a preset type may also be set by a developer. The developer determines a type of character having relatively low reusability according to history records of character strings inputted by users, and sets a character type with relatively low reusability as a preset type. A character matching the preset type is a character of the preset type.

Based on the foregoing descriptions, in this embodiment of the present disclosure, before rendering each character string in the character string set, it may be determined first whether a character of the preset type is included in each character string, and then rendering is performed according to a determination result by using a corresponding rendering method. In the following description of this embodiment of the present disclosure, a target character string included in the character string set is used as an example to describe how to perform rendering according to a determination result by using a corresponding rendering method.

In an embodiment, when it is detected that a target character string does not include a character of a preset type, first rendering preprocessing is performed on a target character included in the target character string to obtain a first rendered data set, the first rendered data set including a target character image corresponding to the target character; and a rendering instruction about the character string set is generated according to the first rendered data set, the rendering instruction being a rendering instruction used for instructing to perform image rendering on the target character image. That the target character string includes no character of the preset type may be that: none of the character types of all target characters in the target character string is the preset type. Alternatively, that the target character string includes no character of the preset type may be that: a quantity of characters with a character type being the preset type in the target character is less than a quantity threshold, and the quantity threshold may be 1, 2 or another value. A manner of determining whether a target character string includes a character of a preset type is not limited in this embodiment of the present disclosure, and may be determined by using actual implementation requirements and rendering performance of the terminal.

In an embodiment, the first rendering preprocessing may be processing of determining a first display parameter required for displaying a target character on a UI displayed on a terminal display and a first rendering parameter corresponding to the target character. The performing first rendering preprocessing on a target character included in the target character string to obtain a first rendered data set may include: determining, based on a character type of the target character, a first display parameter used for displaying the target character on a UI in a floating manner; determining a first rendering parameter corresponding to the target character based on a preset character rendering texture set, the preset character rendering texture set including a character image corresponding to at least one character; and obtaining the first rendered data set according to the first display parameter and the first rendering parameter.

The first display parameter may include a display position of the target character. The display position may be represented in a coordinate form, or may be represented by using a distance from a preset point on the UI and an angle. For example, a coordinates system is established by using a top left vertex on a UI as the origin, and any position on the UI may be represented in a coordinate form. For example, the first display parameter of the target character includes (5, 5), and a unit is centimeter. In another example, the top left vertex on the UI is set to a preset point, and the first display parameter of the target character may include a position of the target character on the UI relative to the position of the preset point, for example, may be represented as 4 cm, 30 degrees north by east.

In an embodiment, an implementation of determining the first display parameter may be determined according to corresponding configuration information displayed in a floating manner preset by the terminal and the typesetting of the target character. The configuration information may include a size of the character, a specific distance from a top position of the UI in which the character string is displayed, a color of the character string, a character pattern of the character string, and other information. The typesetting of the target character may be performing typesetting on the target character included in the target character string according to a preset typesetting rule. How to determine the first display parameter corresponding to the target character is described in the following in detail.

In an embodiment, the first rendering parameter may include a target character image corresponding to the target character and position information of the target character image. The determining a first rendering parameter corresponding to the target character based on a preset character rendering texture set may be: searching the character rendering texture set for the target character image, and determining the position information of the target character image. Alternatively, the determining a first rendering parameter corresponding to the target character based on a preset character rendering texture set may be: generating a target character image corresponding to the target character, updating the preset character rendering texture set according to the target character image, and obtaining position information of the target character image from the updated character rendering texture set. For example, the position information of the target character image is texture coordinates of the target character image in the character rendering texture set.

The preset character rendering texture set includes a character image corresponding to at least one character, and the preset character rendering texture set is preset. According to this embodiment of the present disclosure, for example, when the terminal is idle or there are not many processing services, commonly used characters are obtained, character images corresponding to all characters are generated according to a character image generation rule, and the character images form a character rendering texture set. The preset character rendering texture set may include a text type texture set shown in FIG. 3a and an image type texture set shown in FIG. 3b. In FIG. 3a, a text type texture set 31 includes images of a plurality of text characters, for example, a character image of a Chinese character resembling a 2×2 square grid identified by a label 32. In FIG. 3b, an image type texture set 33 includes images of a plurality of image characters, for example, a character image identified by a label 34. Through the use of the character rendering texture set, many small images (for example, a character image 32 in FIG. 3a and a character image 34 in FIG. 3b) are combined into a big image (for example, identified by the label 31 in FIG. 3a and the label 33 in FIG. 3b). When performing rendering by using a small image, the small image may be positioned in the big image by using coordinates of the small image in the big image, to sample a texture of the small image. In this manner, only one big image may need to be read, and in this implementation, a quantity of times of reading files can be reduced significantly. Compared with storing many small images into files separately and reading the files separately, the reading speed is faster, and therefore rendering efficiency is higher.

In certain embodiments, in the character rendering texture set stored in the terminal, each character image is converted into a corresponding code form for storage. According to this embodiment of the present disclosure, for one character, after generating a character image corresponding to the character according to a character generation rule, the terminal stores a character code corresponding to the character and a code corresponding to the character image in association. When a character image corresponding to the character may need to be obtained, the character image corresponding to the character is found according to the character code and an association storage relationship. For example, it is assumed that a character string included in the character string set is shown in FIG. 3c, and the terminal detects a character code corresponding to each character in the character string. It is assumed that a character code corresponding to a crown image 301 is 660, and the terminal replaces the crown image in the character string with a character code shown as 302 in FIG. 3d, and further replaces other characters in the character string with respective corresponding character codes (not shown in FIG. 3D) (FIG. 3d is only an example of a replacement manner). After obtaining a display parameter and a rendering parameter of each character in FIG. 3d, a corresponding character image is found according to a character code of each character for rendering, so as to obtain a character string displayed on a UI, as shown in FIG. 3c.

In certain embodiments, characters of different character types may correspond to different character codes. For example, a character code corresponding to the character of the crown image may be 660, and character codes corresponding to an emoji character type may be shown in FIG. 3e. CN, JP, and KR shown in the first column represent text characters corresponding to corresponding emojis, and a text character represents the meaning of an emoji. CN represents the Chinese national flag, JP represents the Japanese national flag, and KR represents the South Korea's national flag. The middle column represents an emoji image corresponding to each text character, and the last column represents a character code range corresponding to the corresponding emoji in the terminal.

In an embodiment, after determining the first rendered data set, the terminal may generate a rendering instruction carrying the first rendered data set, and transmit the rendering instruction to a rendering engine, for the rendering engine to render the target character image according to the first rendered data set, so as to display the target character string on the UI.

Step S203: Perform, when or in response to determining a target character string in the character string set includes a character of a preset type, second rendering preprocessing on the target character string to obtain a second rendered data set, the second rendered data set including a character string image corresponding to the target character string, and generate a rendering instruction about the character string set according to the second rendered data set. The rendering instruction is used for instructing to perform image rendering on the character string image. When or in response to determining there are bullet comments, step S203 is to perform non-character level rendering on the bullet comments.

According to this embodiment of the present disclosure, after generating the rendering instruction about the character string set according to the second rendered data set, the terminal may transmit the rendering instruction to a rendering engine, for the rendering engine to perform image rendering on the character string image corresponding to the target character string, so as to display the target character string on the UI of the terminal. In an embodiment, for the second rendering preprocessing, reference may be made to processing of determining a second rendering parameter and a second display parameter corresponding to the target character string. The performing second rendering preprocessing on the target character string to obtain a second rendered data set may include: determining a second display parameter of the target character string based on corresponding configuration information displayed in a floating manner; generating a character string image corresponding to the target character string by using a character string image generation rule; adding the character string image corresponding to the target character string to a preset character rendering texture set to update the preset character rendering texture set, and determining position information of the character string image corresponding to the target character string in the updated character rendering texture set; and determining a second rendering parameter according to the character string image and the position information of the character string image in the updated character rendering texture set, and obtaining the second rendered data set according to the second rendering parameter and the second display parameter.

The corresponding configuration information displayed in a floating manner is described above, and the configuration information may include a size of the character, a distance between a top position of the UI and a position from which a character string starts to be displayed, a color of the character string, a character pattern of the character string, and other information. The second display parameter of the target character string may include a display position. The display position may be represented in a coordinate form, or may be represented in a form of a distance and an angle, and therefore is not described in detail.

In an embodiment, the second rendering parameter may include a character string image corresponding to the target character string and position information of the character string image. For example, the position information of the character string image is texture coordinates of the character string image in the character rendering texture set. In this implementation, during subsequent rendering, the character string image may be found quickly from a preset character image texture according to the position information of the character string image for rendering, so that a rendering time can be reduced. It can be known from the foregoing that, the character rendering texture set preset by the terminal may only include character images corresponding to some commonly used characters, and may not include a character string image corresponding to a character string. The terminal may need to generate a character string image corresponding to a target character string according to a character string image generation rule. For a unified management of the character image, the character string image may be added to the preset character rendering texture set for storage to update the preset character rendering texture set, and then position information of the character string image in the character rendering texture set is obtained.

The character string image and the position information of the character string image in the updated character rendering texture set are combined into the second rendering parameter, and the second rendering parameter and the second display parameter may be combined into the second rendered data set. Then a rendering instruction carrying the second rendered data set is generated, and the rendering instruction is transmitted to a rendering engine. The rendering engine performs image rendering according to the second rendered data set, so as to display the character string set on the UI of the terminal.

In an embodiment, for any character string in the character string set, during character string display processing, the character string display processing method shown in FIG. 2 may be adopted for rendering, so as to display each character string in the character string set on the UI of the terminal.

In an embodiment, if the character string set further includes another character string than the target character string, the rendering instruction is further used for instructing, when or in response to determining the another character string does not include a character of the preset type, to perform image rendering on a character image corresponding to a character included in the another character string; and the rendering instruction is further used for instructing, when or in response to determining the another character string includes a character of the preset type, to perform image rendering on a character string image corresponding to the another character string.

The another character string is processed according to the character string display processing method shown in FIG. 2: If the another character string includes a character of the preset type, first rendering preprocessing is performed on the another character string to obtain a third rendered data set, the third rendered data set including a character string image corresponding to the another character string. If the target character string includes a character of the preset type, a rendering instruction about the character string set is generated according to the third rendered data set and the second rendered data set. The rendering instruction herein instructs the rendering engine to render the character string image corresponding to the another character string and the character string image corresponding to the target character string. If the target character string does not include a character of the preset type, a rendering instruction about the character string set is generated according to the third rendered data set and the first rendered data set. The rendering instruction herein instructs the rendering engine to render the target character image corresponding to the target character in the target character string and the character string image corresponding to the another character string.

In other embodiments, if the another character string does not include a character of the preset type, first rendering preprocessing is performed on the another character string to obtain a fourth rendered data set, the fourth rendered data set including a character image corresponding to another character in the another character string. In this implementation, if the target character string does not include a character of the preset type, a rendering instruction about the character string set is generated according to the fourth rendered data set and the first rendered data set, and the rendering instruction is transmitted to the rendering engine. The rendering instruction in this implementation is used for instructing to perform image rendering on the target character image corresponding to the target character in the target character string and the character image corresponding to the another character. If the target character string includes a character of the preset type, a rendering instruction about the character string set is generated according to the fourth rendered data set and the second rendered data set, and the rendering instruction is transmitted to the rendering engine. The rendering instruction herein is used for instructing to render the character image corresponding to the another character and the character string image corresponding to the target character string.

It can be known from the foregoing that, when the character string set includes a plurality of character strings, the terminal obtains a rendered data set corresponding to each character string, and then transmits a rendering instruction about the character string set to the rendering engine according to the rendered data set corresponding to each character string. Compared with a method of transmitting a rendering instruction about a character string to the rendering engine once a rendered data set of the character string is obtained, this method can effectively reduce a quantity of times of transmitting a rendering instruction to the rendering engine, thereby reducing interaction between the rendering engines, so that the power consumption overhead of the terminal can be reduced.

In this embodiment of the present disclosure, after receiving the character display instruction carrying the character string set, it is detected whether the target character string in the character string set includes a character of the preset type. If the target character string does not include a character of the preset type, the target character string included in the character string set is processed to obtain a first rendered data set, and a rendering instruction about the character string set is generated according to the first rendered data set to instruct to render the target character image. If the target character string includes a character of the preset type, the target character string is processed as a whole to obtain a second rendered data set, and a rendering instruction about the character string set is generated according to the second rendered data set to instruct to render the character string image corresponding to the target character string. In other words, in this embodiment of the present disclosure, for a target character string including no character of the preset type, rendering is performed by using a character as the smallest unit; and for a character string including a character of the preset type, rendering is performed by using the entire target character string as a unit. Different rendering is implemented according to different types of characters included in the target character string. Compared with using the same processing method for all target character strings, the target character strings can be displayed more effectively.

To describe how to adopt the character string display processing method provided in this embodiment of the present disclosure when a character string set includes a plurality of character strings, it is assumed that the character string set includes a target character string and another character string different from the target character string, the target character string includes a target character, the another character string includes another character, and there are at least one target character and another character. In addition, a service calling thread, parsing thread, and rendering thread are run on the terminal, and character string display processing is performed on a character string by using different threads, so that processing processes are independent of each other and do not affect each other, thereby improving the display efficiency of the character string.

Based on the foregoing assumptions, an embodiment of the present disclosure further provides a schematic flowchart of another character string display processing method, as shown in FIG. 4a. The character string display processing method shown in FIG. 4a may be applied to a terminal. A calling thread, parsing thread, and rendering thread are run on the terminal. The character string display processing method shown in FIG. 4a is actually performed by the terminal by invoking the foregoing three threads. In FIG. 4a, a step filled with a specific color is performed by a thread corresponding to the color. The character string display processing method shown in FIG. 4a may include the following steps:

Step S401: Receive a character display instruction, the character display instruction being used for instructing to render a character string set.

The character string set may include a target character string and another character string, the target character string includes a target character, and the another character string includes another character. Neither of the target character string and the another character string may include a character of a preset type. Alternatively, both the target character string and the another character string may include a character of a preset type. Alternatively, one of the target character string and the another character string includes a character of a preset type, and the other one does not include a character of a preset type. An example in which the target character string does not include a character of a preset type and the another character string includes a character of a preset type is used for description.

In an embodiment, step S401 may be performed by invoking the calling thread by the terminal. In certain embodiments, the calling thread may be configured to receive some to-be-performed services, for example, a rendering and display task on a character string, or a service of enabling or disabling a bullet comment.

Step S402: Detect whether the target character string and the another character string include a character of a preset type.

In an embodiment, the terminal may invoke the calling thread to detect a target character included in the target character string and another character included in the another character string, to determine whether the target character string and the another character string include a character of a preset type, and may transmit a detection result to the parsing thread, for the parsing thread to separately process the target character string and the another character string according to the detection result.

In an embodiment, when the terminal detects that the target character string does not include a character of a preset type, first rendering preprocessing may be performed on the target character in the target character string by using step S403 to step S407 to obtain a first rendered data set corresponding to the target character string. Step S403, step S404, step S406, and step S407 may be performed by the terminal by invoking the parsing thread, and step S405 may be performed by the terminal by invoking the rendering thread. If the terminal detects that the target character string includes a character of a preset type, second rendering preprocessing may be performed on the another character string by using step S408 to step S4011 to obtain a third rendered data set corresponding to the another character string. Step S408, step S4010, and step S4011 may be performed by the terminal by invoking the parsing thread, and step S409 may be performed by the terminal by invoking the rendering thread.

Step S403: Detect, when or in response to determining the target character string does not include a character of a preset type, whether a preset character rendering texture set includes a character image matching the target character included in the target character string.

In an embodiment, it may be learned from the embodiment shown in FIG. 2 that, for the performing first rendering preprocessing on the target character in the target character string, reference may be made to processing of determining a first display parameter and a first rendering parameter corresponding to the target character. The determining a first rendering parameter corresponding to the target character may be implemented by using step S403 to step S405, which is described in the following. The determining a first display parameter corresponding to the target character may be implemented by using step S406.

In an embodiment, the first rendering parameter of the target character includes a target character image corresponding to the target character and a position of the target character image. In certain embodiments, a character rendering texture set is preset by the terminal, and the character rendering texture set stores character images corresponding to some preset commonly used characters. When obtaining the target character image corresponding to the target character, the terminal may first detect whether the character rendering texture set presets a target character image corresponding to the target character. If the character rendering texture set does not preset a target character image corresponding to the target character, the terminal may need to generate a target character image according to a character image generation rule, to further determine position information of the target character image. If the character rendering texture set presets a target character image corresponding to the target character, the terminal may directly obtain the target character image and position information of the target character image from the character rendering texture set. Therefore, the step of generating a target character image is skipped, so that the power consumption overhead of the terminal can be partially reduced, the character string display processing speed of the terminal can also be increased.

Step S404: Determine, when or in response to determining the character rendering texture set includes a character image matching the target character, the matched character image as the target character image corresponding to the target character, and determine the position information of the target character image according to a position of the matched character image in the character rendering texture set.

In an embodiment, the character rendering texture set preset by the terminal stores character images corresponding to at least one character, and these character images are stored in a particular storage sequence. For example, the terminal presets a storage space with N rows and M columns. N and M are positive integers greater than 1. For a storage sequence, storage may be performed based on columns. That is, the first character image is stored at a position of the first row and the first column, the second character image is stored at a position of the second row and the first column, and so on. When the first column is full, character images are stored in a next column. Alternatively, for the storage sequence, storage may be performed based on rows, or another storage sequence may be further included. This is not limited in this embodiment of the present disclosure. Based on this, the terminal may record a position corresponding to each character image in the character rendering texture set.

In an embodiment, the terminal may store a character code and a character image in association when storing the preset character image. When detecting whether the character rendering texture set includes a character image matching the target character, the terminal may first parse the target character to obtain a character code corresponding to the target character; and then detect whether the character rendering texture set includes a character image corresponding to the character code. If the character rendering texture set includes a character image corresponding to the character code, it is determined that the character rendering texture set includes a character image matching the target character; and if the character rendering texture set does not include a character image corresponding to the character code, it is determined that the character rendering texture set does not include a character image matching the target character. The terminal may determine a position of the matched character image as the position information of the target character image.

Step S405: Generate, when or in response to determining the character rendering texture set does not include a character image matching the target character, a target character image corresponding to the target character by using a character rendering image generation rule, and add the target character image to the preset character rendering texture set according to a preset storage rule to update the character rendering texture set; and determine position information of the target character image in the updated character rendering texture set according to the preset storage rule as the position information of the target character image.

In an embodiment, if the character rendering texture set does not include a character image matching the target character, the terminal may generate a target character image corresponding to the target character according to the character rendering image generation rule. To enrich the preset character rendering texture set, the generated target character image may be added to the preset character rendering texture set. Because the terminal stores the character images into the character rendering texture set in a preset storage sequence, the terminal may obtain position information of the target character image in the character rendering texture set according to the storage sequence.

In other embodiments, when presetting a character rendering texture set, the terminal may store a text type character image and an image type character image into one character rendering texture set. Alternatively, the terminal may set two different character rendering texture sets to store text type character images and image type character images that are preset for display. If the terminal sets a character rendering texture set of text type character images and a character rendering texture set of image type character images, before step S404 is performed, the target character may be further parsed to determine a character type of the target character; and then a corresponding character rendering texture set is found according to the character type of the target character, so as to find the target character image. In this implementation, it may take less time for the terminal to check whether there is a character image matching the target character, and the search accuracy can also be improved by performing searches in different character rendering texture sets.

Step S406: Determine, based on a character type of the target character, a first display parameter used for displaying the target character on a UI in a floating manner.

It may be learned from the foregoing that, the character type in step S406 may include a text type and an image type, and each character type has a corresponding typesetting rule. A specific implementation of step S406 may include: performing typesetting on the target character according to a typesetting rule corresponding to the character type of the target character; and determining the first display parameter corresponding to the target character according to the typeset target character and corresponding configuration information displayed in a floating manner.

In an embodiment, the typesetting rule further includes an alignment rule. When a character string is typeset according to an alignment rule, characters included in the character string in a typesetting result are aligned with each other. The typesetting rule may include a baseline alignment, a vertical center alignment, and the like. In an embodiment, the performing typesetting on the target character according to a typesetting rule corresponding to the character type of the target character may actually be performing typesetting on the target character according to an alignment rule indicated in the typesetting rule corresponding to the character type of the target character. In certain embodiments, in this embodiment of the present disclosure, the alignment rule indicated in the typesetting rule corresponding to text type characters means the baseline alignment, and an alignment rule corresponding to image type characters may be the vertical center alignment. In other embodiments, the typesetting rule further includes a distance between characters, a size of a character, a shape of a character, and other information.

In an embodiment, because different character types may correspond to different typesetting rules, and there is at least one target character, if there are a plurality of target characters (assuming that the target character includes a first character and a second character), when performing typesetting on the target characters according to an alignment rule indicated in a typesetting rule corresponding to types of the target characters, it may further need to be considered whether character types of the target characters are the same, to further adopt different methods for typesetting.

If the target character includes a first character and a second character, the performing typesetting on the target character according to a typesetting rule corresponding to the character type of the target character includes: performing, when or in response to determining a first character type corresponding to the first character is the same as a second character type corresponding to the second character, typesetting on the first character and the second character according to an alignment rule indicated in a typesetting rule corresponding to the first character type or the second character type; and performing, when or in response to determining the first character type is different from the second character type, typesetting on the first character according to a size of the first character and an alignment rule corresponding to the first character type and typesetting on the second character according to a size of the second character and an alignment rule corresponding to the second character type.

In an embodiment, when the first character type is the same as the second character type, both the first character type and the second character type may be a text type, or both the first character type and the second character type may be an image type. It is assumed that the alignment rule indicated in the typesetting rule corresponding to the text type is the baseline alignment, and the alignment rule indicated in the typesetting rule corresponding to the image type is the vertical center alignment.

In an embodiment, when both the first character type and the second character type are the text types, an implementation of performing typesetting on the first character and the second character according to the alignment rule indicated in the typesetting rule corresponding to the first character type or the second character type may include: performing typesetting on the first character and the second character on a default baseline according to a character pitch and other information indicated in the typesetting rule; finding under-baseline parts of the typeset first character and second character (for ease of the following description, under-baseline parts of the first character and the second character are referred to as an under-baseline character pattern, and above-baseline parts of the first character and the second character are referred to as above-baseline character patterns), obtaining heights of under-baseline character patterns, and using a baseline corresponding to an under-baseline character pattern with the largest height as a baseline of the target character string, that is, as a position from which a bottom part of the target character string starts; and obtaining heights of above-baseline character patterns, and using a sum of a height of an above-baseline character pattern with the largest height and a height of the under-baseline character pattern with the largest height as a height of the target character string.

For example, it is assumed that the target character includes "0", "p", "e", "n", "g", and "1", and the characters are typeset based on the default baseline according to the character pitch and other information indicated in the typesetting rule. A typesetting result may be shown in FIG. 5a. 501 in FIG. 5a represents a default baseline. Then heights of character patterns of the under-baseline characters are determined. None of the characters "0", "1", "e", and "n" includes under-baseline character patterns, and the characters "p" and "g" include under-baseline character patterns. Heights of the two under-baseline character patterns are determined. It is assumed that a length of the under-baseline character pattern of the character "p" is the largest, and as shown by 502, a baseline of the character "p" is used as a baseline of the target character string. Further, heights of above-baseline character patterns of the characters are determined. It is assumed that heights of above-baseline character patterns of the character "0" and the character "1" are the largest, and a height of the target character string may be determined by using the following operations: using a sum of a height of an above-baseline character pattern with the largest height and a height of the under-baseline character pattern with the largest height as a height of the target character string. In FIG. 5a, as shown by 51 in FIG. 5a, an above-baseline character pattern having the largest height is an above-baseline character pattern corresponding to the character "0" or the character "1", and as shown by 52 in FIG. 5a, an under-baseline character pattern having the largest height is an under-baseline character pattern corresponding to the character "p". A sum of the height of 51 and the height of 52 is determined as the height of the target character string.

In other embodiments, when both the first character type and the second character type are image types, an implementation of performing typesetting on the first character and the second character according to the alignment rule indicated in the typesetting rule corresponding to the first character type or the second character type may include: performing typesetting on one character with the larger size in the first character and the second character first according to the typesetting rule; calculating coordinates of a top left vertex of the other character according to a height of the character with the larger size, and performing typesetting according to the calculated coordinates of the top left vertex; and determining a height of the character with the larger size in the two characters as a height of the target character. The calculating coordinates of a top left vertex of the other character according to a height of the character with the larger size is implemented by using the following formula: the coordinates of the top left vertex=(a height of the character with the larger size–a height of the character)/2+ the height of the character.

For example, as shown in FIG. 5b, it is assumed that characters included in the target character string are characters of three image types, which are respectively a "crying emoji", a "shield image", and a "laughing emoji". In sizes of the three characters, a size of the "shield image" is the largest, and sizes of the other two characters are the same. The typesetting of the three characters may be shown in FIG. 5c: performing typesetting on the "shield image" according to the typesetting rule first; determining coordinates of top left vertexes of the "crying emoji" and the "laughing emoji" respectively according to a height of the "shield image" and heights of the "crying emoji" and the "laughing emoji"; performing typesetting on the "crying emoji" and the "laughing emoji" according to respective vertex coordinates; and determining the height of the "shield image" as the height of the target character string.

In an embodiment, if the first character type is different from the second character type, the first character is typeset according to an alignment rule indicated in a typesetting rule corresponding to the first character type, and the second character is typeset according to an alignment rule indicated in a typesetting rule corresponding to the second character type. The foregoing operation may include: comparing a size of the first character with a size of the second character; performing, when or in response to determining the size of the first character is greater than the size of the second character, typesetting on the first character according to an alignment rule indicated in a typesetting rule corresponding to the first character type, and determining a height of the target character string according to a typesetting result; and performing typesetting on the second character based on the height of the target character string and the alignment rule indicated in the typesetting rule corresponding to the second character type. Similarly, if the size of the second character is greater than the size of the first character, typesetting is performed on the second character according to an alignment rule indicated in a typesetting rule corresponding to the second character type, and a height of the target character string is determined according to a typesetting result; and typesetting is performed on the first character based on the height of the target character string and the alignment rule indicated in the typesetting rule corresponding to the first character type. That is, one character with the larger size in the first character and the second character is typeset first, and then the other character with the smaller size is typeset.

In an embodiment, the first character type is different from the second character type may include that: the first character type is a text type, and the second character type is an image type; or the first character type is an image type, and the second character type is a text type. For example, FIG. 5d is a schematic diagram of target character typesetting according to an embodiment of the present disclosure. It is assumed that the target character string includes characters "0", "p", "e", "n", "g", and "1" of a text type and characters such as the "shield image" and the "crying emoji" shown in FIG. 5b of an image type. If the "shield image" has the largest size and the "crying emoji" has the smallest size, during typesetting, the "shield image" is typeset first, then the foregoing text type characters are typeset, and then the "crying emoji" is finally typeset. A specific implementation of typesetting may be that: using the height of the "shield image" as the height of the target character string; determining, based on a vertical center rule, a height occupied by a text type character part including a bottom part position 503 and a top part position 504 of the text type characters; and performing typesetting on the character "0" with the largest length in the text type characters according to a top part position B, then using a bottom part position 505 of "0" as a baseline for typesetting the text type characters, and performing typesetting on other characters between 503 and

504 according to the baseline alignment rule. After the foregoing text type characters are typeset, the "crying emoji" is typeset according to the vertical center alignment rule.

In another example, in FIG. 5d, if the size of the text type character is greater than the size of the character of the image type, the characters are first typeset according to a baseline alignment rule, to determine a height of the target character string. As shown in FIG. 5e, 506 represents a baseline, and a distance between 507 and 508 represents the height of the target character string. Coordinates of a top left vertex of the largest character in the image type characters are determined based on the height of the target character string and a vertical alignment rule, and typesetting and storing the largest image type character according to the coordinates. Other image type characters may be typeset according to the foregoing process of typesetting the image type characters. Details are not described herein.

In addition, from FIG. 5a to FIG. 5e, typesetting a character includes typesetting a bitmap and/or an image corresponding to the character.

Step S407: Determine a first rendering parameter corresponding to the target character according to the target character image and the position information of the target character image, and determine a first rendered data set according to the first rendering parameter and the first display parameter.

In an embodiment, the target character image and the position information of the character image are combined to obtain a first rendering parameter corresponding to the target character, and the first rendering parameter and the first display parameter are combined to obtain a first rendered data set.

Step S408: Generate, when or in response to determining the another character string includes a character of a preset type, a character string image corresponding to the another character string by using a character string image generation rule.

Step S409: Add the character string image corresponding to the another character string to a preset character rendering texture set to update the character rendering texture set, and determine position information of the character string image corresponding to the another character string in the updated character rendering texture set.

Step S4010: Determine a third display parameter of the another character string based on corresponding configuration information displayed in a floating manner.

Step S4011: Determine a third rendering parameter corresponding to the another character string according to the character string image corresponding to the another character string and the position information of the character string image in the updated character rendering texture set, and obtain a third rendered data set according to the third rendering parameter and the third display parameter.

Step S408 to step S4011 describe how to perform the second rendering preprocessing to obtain the third rendered data set for other character strings including no character of the preset type. For some feasible implementations herein, reference may be made to the description of step S203 in the embodiment shown in FIG. 2. Details are not described herein.

Step S4012: Generate a rendering instruction about the character string set according to the first rendered data set and the third rendered data set, and transmit the rendering instruction to a rendering engine, for the rendering engine to perform image rendering based on the second rendered data set and the third rendered data set.

In an embodiment, the first rendered data set and the third rendered data set are carried in a rendering instruction. Compared with a manner in which each rendering instruction carries a rendered data set, a quantity of rendering instructions can be reduced, thereby reducing the power consumption overhead of the terminal.

In certain embodiments, FIG. 4a only shows how to display a character string when a target character string does not include a character of a preset type and another character string includes a character of a preset type. In an actual implementation, there may be situations that a target character string includes a character of a preset type and another character string does not include a character of a preset type; or neither of a target character string and another character string includes a character of a preset type, or both a target character string and another character string include a character of a preset type. In these implementations, for a specific character string display processing process, reference may be made to descriptions of corresponding steps in FIG. 4a. Details are not described herein.

In this embodiment of the present disclosure, if the character display instruction includes two character strings: a target character string and the another character string, the target character string does not include a character of a preset type, and the another character string includes a character of a preset type, processing of the target character string includes: detecting whether a preset character rendering texture set includes a character image matching the target character included in the target character string; determining, when or in response to determining the character rendering texture set includes a character image matching the target character, the matched character image as the target character image corresponding to the target character, and determining the position information of the target character image according to a position of the matched character image in the character rendering texture set; generating, when or in response to determining the character rendering texture set does not include a character image matching the target character, a target character image corresponding to the target character by using a character rendering image generation rule, and adding the target character image to the preset character rendering texture set according to a preset storage rule to update the character rendering texture set; and determining position information of the target character image in the updated character rendering texture set according to the preset storage rule as the position information of the target character image; determining, based on a character type of the target character, a first display parameter used for displaying the target character on a UI in a floating manner; and determining a first rendering parameter corresponding to the target character according to the target character image and the position information of the target character image, and determining a first rendered data set according to the first rendering parameter and the first display parameter.

Processing of the another character string may include: generating a character string image corresponding to the another character string by using a character string image generation rule; adding the character string image corresponding to the another character string to a preset character rendering texture set to update the character rendering texture set, and determining position information of the character string image corresponding to the another character string in the updated character rendering texture set; determining a third display parameter of the another character string based on corresponding configuration information displayed in a floating manner; determining a third rendering parameter corresponding to the another character string according to the character string image corresponding to the another character string and the position information of the character string image in the updated character rendering texture set, and obtaining a third rendered data set according to the third rendering parameter and the third display parameter; and finally generating a rendering instruction about the character string set according to the first rendered data set and the third rendered data set, and transmitting the rendering instruction to a rendering engine, for the rendering engine to perform image rendering based on the second rendered data set and the third rendered data set.

In the foregoing character string display processing process, different rendering is implemented according to different types of characters included in the target character string. Compared with using the same processing method for all target character strings, the target character strings can be displayed more effectively. In addition, the first rendered data set and the third rendered data set are added to one rendering instruction to be transmitted to the rendering engine, so that interaction between the terminal and the rendering engine can be reduced, thereby reducing the power consumption overhead of the terminal.

In addition, when performing the first rendering preprocessing on the target character in the target character string, a preset character rendering texture set is introduced. First, it is detected whether the preset character rendering texture set includes a character image matching the target character, and a target character image corresponding to the target character is directly obtained if the preset character rendering texture set includes a character image matching the target character. If the preset character rendering texture set does not include a character image matching the target character, a target character string image corresponding to the target character is then generated, thereby effectively reducing a quantity of generated character images, and improving rendering efficiency while reducing the power consumption of the terminal.

FIG. 4b is a schematic flowchart of still another character string display processing method according to an embodiment of the present disclosure. FIG. 4b is described by using adding a bullet comment as an example.

As shown in FIG. 4b, in step S4013, the terminal receives an instruction of adding a bullet comment by using a calling thread. For example, the instruction of adding a bullet comment is a character display instruction transmitted by a server. Then, in step S4014, the terminal determines, by using the calling thread, whether to draw a bullet comment on a character level (character by character). For example, a determination condition is to detect whether a target character string in a character string set that forms a bullet comment includes a character of a preset type (step S402 shown in FIG. 4a). When or in response to determining the target character string does not include a character of a preset type, it is determined that the bullet comment is drew on a character level; and when or in response to determining the target character string includes a character of a preset type, it is determined that the bullet comment is drawn on a non-character level. It may also be determined, according to other determination conditions, whether to draw the bullet comment on the character level.

If the bullet comment is drawn on the character level, in step S4016, the terminal parses each character included in a target character string in the bullet comment by using a parsing thread. For example, the parsing is to determine a code of each character or the like. After parsing the characters in the target character string, in step S4017, the terminal determines, by using the parsing thread, whether a bitmap corresponding to each character is cached in a character rendering texture set in an internal memory of the terminal. For Step S4016 and step S4017, reference may be made to step S403 in FIG. 4a. If a bitmap corresponding to a character has been cached in the character rendering texture set already, the terminal performs step S4021. If a bitmap corresponding to a character is not in the cached character rendering texture set, the terminal obtains/generates a bitmap of the character in step S4019 by using the parsing thread, transmits the bitmap to the cached character rendering texture set in step S4020 by using the rendering thread, and then performs step S4021. For Step S4019 and step S4020, reference may be made to step S405 in FIG. 4a. Data in the cached character rendering texture set may be updated in a least recently used manner. If a piece of data (a bitmap of a character) is accessed recently, the data is more likely to be accessed in the future.

In step S4021, the terminal calculates a vertex and texture coordinates of a bitmap of each character by using the parsing thread. The vertex is a display position of the bitmap of the character on a display, and the texture coordinates are used for identifying a position of the bitmap of the character in a character rendering texture set (for example, a big image 31 in FIG. 3a and a big image 33 in FIG. 3b). Then, in step S4022, the terminal combines coordinates of bitmaps of all the characters by using a texture as a unit and by using the rendering thread, and performs rendering in step S4023.

If it is determined in step S4014 that the bullet comment is not drawn on a character level, and for example, is drawn as a whole, in step S4015, the terminal calculates vertex coordinates of an entire bitmap of the bullet comment by using the parsing thread, and in step S4018, uses the entire bitmap of the bullet comment as a texture to be uploaded to the cached character rendering texture set by using the rendering thread. Then, the terminal combines coordinates of all the characters in step S4022 by using a texture as a unit and by using the rendering thread, and performs rendering in step S4023 by using the rendering thread.

When rendering the texture, a signed distance field may be adopted, and the bitmap of the characters may be rendered by using a smooth difference. In this implementation, a relatively small texture image may be used, and distortion may not occur when the image is zoomed out.

According to this embodiment of the present disclosure, the asynchronous parsing thread and rendering thread may be performed by a GPU, and the GPU is fully used to reduce the impact of the character parsing on the rendering, and also to reduce rendering instructions, further to avoid a frozen bullet comment.

To verify the high efficiency of this embodiment of the present disclosure in the aspect of character string display processing, an example of adding a bullet comment to a video is used. The character string display processing method described in this embodiment of the present disclosure is compared with a bullet comment addition method. It is assumed that the following comparison result is obtained when or in response to determining the terminal shows 100 bullet comments per second, and the comparison result is shown in Table 1.

TABLE 1

| Comparison dimensions | Comparison | The embodiments of the present disclosure |
| --- | --- | --- |
| A quantity of generated character images or character string images | Using a bullet comment as a unit, and in direct proportion to a quantity of bullet comments | A character rendering texture set is preset, which effectively reduces the quantity of the generated character images or character string images |
| Rendering instruction (one frame) | In direct proportion to a quantity of bullet comments | Perform rendering instruction combination on a plurality of bullet comments |
| Thread | Rendering is performed by using the same thread, and the displayed bullet comments are frozen | Rendering is performed by using different threads separately, and the displayed bullet comments are smooth |
| Refresh rate | 20.12 | 59.87 |
| Process internal memory | 185.1 | 95.67 |
| Processor occupancy | 16.9% | 5.84% |

It can be seen from Table 1 that, in view of the comparison as tabulated, the embodiments of the present disclosure have advantages of the following several aspects:

According to a first aspect, as a comparison, rendering is performed by using the entire bullet comment as a unit. In this implementation, a quantity of generated character string images is in direct proportion to a quantity of bullet comments. However, according to the character string display processing method provided in this embodiment of the present disclosure, a character rendering texture set is preset, and for whether a target character string includes a character of a preset type, it is determined whether to perform rendering by using characters included in a bullet comment as a unit or to perform rendering by using the entire bullet comment as a unit. Moreover, only when the character rendering texture set does not include a character image or character string image matching the bullet comment, a character image or character string image is generated, thereby reducing a quantity of generated character images or character string images, and reducing the power consumption overhead of the terminal.

According to a second aspect, for a bullet comment, after generating a rendered data set corresponding to the bullet comment, a terminal transmits a rendering instruction to a rendering engine. In this implementation, a quantity of rendering instructions is in direct proportion to a quantity of bullet comments, which results in frequent interaction between the terminal and the rendering engine and an impact on the rendering speed. However, in the embodiments of the present disclosure, rendered data sets of a plurality of bullet comments are carried in the same rendering instruction to be transmitted to the rendering engine for rendering, which effectively reduces the interaction between the terminal and the rendering engine, thereby improving the rendering speed.

According to a third aspect, the parsing, rendering, and display of the bullet comment are performed in the same thread, and character strings may be frozen when there are a large quantity of bullet comments. However, in the embodiments of the present disclosure, the parsing and rendering of the bullet comments are performed by a service calling thread, parsing thread, and rendering thread separately, and the bullet comment display is not affected. The bullet comments can be displayed smoothly when there are a relatively large quantity of character strings.

According to a fourth aspect, by adopting the character string display processing method provided in the embodiments of the present disclosure, a refresh rate of a video screen is greater than a refresh rate; an internal memory occupied by a process in the character string display processing method according to the embodiments of the present disclosure is much less than an internal memory occupied; and a processor occupancy in a processing process of the character string display processing method according to the embodiments of the present disclosure is advantageously lower.

Based on the character string display processing method, an embodiment of the present disclosure further discloses a character string display processing apparatus. The character string display processing apparatus may perform the character string display processing method shown in FIG. 2 and FIG. 4a, and the character string display processing apparatus may be configured in a terminal. Referring to FIG. 6, the character string display processing apparatus may operate the following units: a receiving unit 601, configured to receive a character display instruction, the character display instruction being used for instructing to render a character string set; and a processing unit 602, configured to: perform, when or in response to determining a target character string in the character string set does not include a character of a preset type, first rendering preprocessing on a target character included in the target character string to obtain a first rendered data set, the first rendered data set including a target character image corresponding to the target character, and generate a rendering instruction about the character string set according to the first rendered data set to instruct to perform image rendering on the target character image, the processing unit 602 being further configured to: perform, when or in response to determining a target character string in the character string set includes a character of a preset type, second rendering preprocessing on the target character string to obtain a second rendered data set, the second rendered data set including a character string image corresponding to the target character string, and generate a rendering instruction about the character string set according to the second rendered data set to instruct to perform image rendering on the character string image.

In an embodiment, the character string set further includes another character string than the target character string, and the rendering instruction is further used for instructing, when or in response to determining the another character string does not include a character of the preset type, to perform image rendering on a character image corresponding to a character included in the another character string; and the rendering instruction is further used for instructing, when or in response to determining the another character string includes a character of the preset type, to perform image rendering on a character string image corresponding to the another character string.

In an embodiment, when performing the first rendering preprocessing on the target character included in the target character string to obtain the first rendered data set, the processing unit 602 performs the following operations: determining, based on a character type of the target character, a first display parameter used for displaying the target character on a UI in a floating manner; determining a first rendering parameter corresponding to the target character based on a preset character rendering texture set, the preset character rendering texture set including a character image corresponding to at least one character; and obtaining the first rendered data set according to the first display parameter and the first rendering parameter.

In an embodiment, the first rendering parameter includes a target character image corresponding to the target character and position information of the target character image, and when determining a first rendering parameter corresponding to the target character based on a preset character rendering texture set, the processing unit 602 performs the following operations: determining, when or in response to determining the character rendering texture set includes a character image matching the target character, the matched character image as the target character image corresponding to the target character, and determining the position information of the target character image according to a position of the matched character image in the character rendering texture set.

In an embodiment, when determining a first rendering parameter corresponding to the target character based on a preset character rendering texture set, the processing unit 602 performs the following operations: generating, when or in response to determining the character rendering texture set does not include a character image matching the target character, a target character image corresponding to the target character by using a character rendering image generation rule, and adding the target character image to the character rendering texture set according to a preset storage rule to update the character rendering texture set; and determining position information of the target character image in the updated character rendering texture set according to the preset storage rule as the position information of the target character image.

In an embodiment, when determining, based on a character type of the target character, a first display parameter used for displaying the target character on a UI, the processing unit 602 performs the following operations: performing typesetting on the target character according to a typesetting rule corresponding to the character type of the target character; and determining the first display parameter corresponding to the target character according to the typeset target character and corresponding configuration information displayed in a floating manner.

In an embodiment, the target character includes a first character and a second character, and when performing typesetting on the target character according to a typesetting rule corresponding to the character type of the target character, the processing unit 602 performs the following operations: performing, when or in response to determining a first character type corresponding to the first character is the same as a second character type corresponding to the second character, typesetting on the first character and the second character according to an alignment rule indicated in a typesetting rule corresponding to the first character type or the second character type; and performing, when or in response to determining the first character type is different from the second character type, typesetting on the first character according to an alignment rule indicated in a typesetting rule corresponding to the first character type and typesetting on the second character according to an alignment rule indicated in a typesetting rule corresponding to the second character type.

In an embodiment, when performing typesetting on the first character according to an alignment rule indicated in a typesetting rule corresponding to the first character type and typesetting on the second character according to an alignment rule indicated in a typesetting rule corresponding to the second character type, the processing unit 602 performs the following operations: comparing a size of the first character with a size of the second character; performing, when or in response to determining the size of the first character is greater than the size of the second character, typesetting on the first character according to the alignment rule indicated in the typesetting rule corresponding to the first character type, and determining a height of the target character string according to a typesetting result; and performing typesetting on the second character based on the height of the target character string and the alignment rule indicated in the typesetting rule corresponding to the second character type.

In an embodiment, a second rendering parameter includes a character string image corresponding to the target character string and position information of the character string image, and when performing the second rendering preprocessing on the target character string to obtain the second rendered data set, the processing unit 602 performs the following operations: determining a second display parameter of the target character string based on corresponding configuration information displayed in a floating manner; generating a character string image corresponding to the target character string by using a character string image generation rule; adding the character string image corresponding to the target character string to a preset character rendering texture set to update the preset character rendering texture set, and determining position information of the character string image corresponding to the target character string in the updated character rendering texture set; and determining a second rendering parameter according to the character string image and the position information of the character string image in the updated character rendering texture set, and obtaining the second rendered data set according to the second rendering parameter and the second display parameter.

In an embodiment, a calling thread, parsing thread, and rendering thread are run on the terminal. The terminal invokes the calling thread to receive the character display instruction and detect the target character included in the target character string; the terminal invokes the parsing thread to perform the first rendering preprocessing on the target character included in the target character string to obtain the first rendered data set, and perform the second rendering preprocessing on the target character string to obtain the second rendered data set; and the terminal invokes the rendering thread to generate the rendering instruction according to the first rendered data set and generate the rendering instruction according to the second rendered data set.

In an embodiment of the present disclosure, the steps in the method shown in FIG. 2 and FIG. 4*a* may be performed by the units of the character string display processing apparatus shown in FIG. 6. For example, step S201 shown in FIG. 2 may be performed by the receiving unit 601 in the character string display processing apparatus shown in FIG.

6, and step S202 and step S203 may be performed by the processing unit 602 in the character string display processing apparatus shown in FIG. 6. In another example, step S401 shown in FIG. 4a may be performed by the receiving unit 601 in the character string display processing apparatus shown in FIG. 6, and step S402 to step S4012 may be performed by the processing unit 602 in the character string display processing apparatus shown in FIG. 6.

According to another embodiment of the present disclosure, the units of the character string display processing apparatus shown in FIG. 6 may be separately or wholly combined into one or several other units, or one (or more) of the units herein may further be divided into a plurality of units of smaller functions. In this way, same operations may be implemented, and the implementation of the technical effects of the embodiments of the present disclosure is not affected. The foregoing units are divided based on logical functions. In an actual implementation, a function of one unit may also be implemented by a plurality of units, or functions of a plurality of units are implemented by one unit. In other embodiments of the present disclosure, the character string display processing apparatus may also include other units. In an actual implementation, the functions may also be cooperatively implemented by other units and may be cooperatively implemented by a plurality of units.

According to another embodiment of the present disclosure, a computer program (including program code) that can perform the steps in the corresponding method shown in FIG. 2 or FIG. 4a may be run on a general-purpose computing device, such as a computer, which includes processing elements and storage elements such as a central processing unit (CPU), a random access memory (RAM), and a read-only memory (ROM), to construct the character string display processing apparatus shown in FIG. 6 and implement the character string display processing method in the embodiments of the present disclosure. The computer program may be recorded in, for example, a computer-readable storage medium, and may be loaded into the foregoing computing device by using the computer-readable storage medium, and run on the computing device.

In this embodiment of the present disclosure, after receiving the character display instruction carrying the character string set, it is detected whether the target character string in the character string set includes a character of the preset type. If the target character string does not include a character of the preset type, the target character string included in the character string set is processed to obtain a first rendered data set, and a rendering instruction about the character string set is generated according to the first rendered data set to instruct to render the target character image. If the target character string includes a character of the preset type, the target character string is processed as a whole to obtain a second rendered data set, and a rendering instruction about the character string set is generated according to the second rendered data set to instruct to render the character string image corresponding to the target character string. In other words, for a target character string including no character of the preset type, rendering is performed by using a character as the smallest unit; and for a character string including a character of the preset type, rendering is performed by using the entire target character string as a unit. Different rendering is implemented according to different types of characters included in the target character string. Compared with using the same processing method for all target character strings, the target character strings can be displayed more effectively.

Based on the descriptions of the foregoing method embodiments and apparatus embodiments, an embodiment of the present disclosure further provides a terminal. FIG. 7 is a schematic structural diagram of a terminal according to an embodiment of the present disclosure. As shown in FIG. 7, the terminal may include a processor 701 and a computer storage medium 702.

The computer storage medium 702 may be stored in a memory of the terminal. The computer storage medium 702 is configured to store a computer program. The computer program includes program instructions. The processor 701 is configured to execute the program instructions stored in the computer storage medium 702. The processor 701 (or referred to as a CPU) is a computing core and control core of the terminal, which is adapted to implement one or more instructions, and adapted to load and execute one or more instructions to implement corresponding method processes or corresponding functions. In an embodiment, the processor 701 may be configured to: receive a character display instruction, the character display instruction being used for instructing to render a character string set; perform, when or in response to determining a target character string in the character string set does not include a character of a preset type, first rendering preprocessing on a target character included in the target character string to obtain a first rendered data set, the first rendered data set including a target character image corresponding to the target character, and generate a rendering instruction about the character string set according to the first rendered data set to instruct to perform image rendering on the target character image; and perform, when or in response to determining a target character string in the character string set includes a character of a preset type, second rendering preprocessing on the target character string to obtain a second rendered data set, the second rendered data set including a character string image corresponding to the target character string, and generate a rendering instruction about the character string set according to the second rendered data set to instruct to perform image rendering on the character string image.

An embodiment of the present disclosure further provides a computer storage medium (memory), and the computer storage medium is a memory device in an electronic device and is configured to store programs and data. In certain embodiments, the computer storage medium herein may include an internal storage medium of the electronic device and may also include an extended storage medium supported by the device. The computer storage medium provides a storage space, and the storage space further stores one or more instructions suitable to be loaded and executed by the processor 701. The instructions may be one or more computer programs (including program code). The computer storage medium herein may be a high-speed RAM memory, or may be a non-volatile memory, such as at least one magnetic disk storage. In certain embodiments, the computer storage medium may be alternatively at least one computer storage medium far away from the foregoing processor.

In an embodiment, if the character string set further includes another character string than the target character string, and the rendering instruction is further used for instructing, when or in response to determining the another character string does not include a character of the preset type, to perform image rendering on a character image corresponding to a character included in the another character string; and the rendering instruction is further used for instructing, when or in response to determining the another character string includes a character of the preset type, to perform image rendering on a character string image corresponding to the another character string.

In an embodiment, when performing the first rendering preprocessing on the target character included in the target character string to obtain the first rendered data set, the processor 701 performs the following operations: determining, based on a character type of the target character, a first display parameter used for displaying the target character on a UI in a floating manner; determining a first rendering parameter corresponding to the target character based on a preset character rendering texture set, the preset character rendering texture set including a character image corresponding to at least one character; and obtaining the first rendered data set according to the first display parameter and the first rendering parameter.

In an embodiment, the first rendering parameter includes a target character image corresponding to the target character and position information of the target character image, and when determining a first rendering parameter corresponding to the target character based on a preset character rendering texture set, the processor 701 performs the following operations: determining, when or in response to determining the character rendering texture set includes a character image matching the target character, the matched character image as the target character image corresponding to the target character, and determining the position information of the target character image according to a position of the matched character image in the character rendering texture set.

In an embodiment, when determining a first rendering parameter corresponding to the target character based on a preset character rendering texture set, the processor 701 performs the following operations: generating, when or in response to determining the character rendering texture set does not include a character image matching the target character, a target character image corresponding to the target character by using a character rendering image generation rule, and adding the target character image to the character rendering texture set according to a preset storage rule to update the character rendering texture set; and determining position information of the target character image in the updated character rendering texture set according to the preset storage rule as the position information of the target character image.

In an embodiment, when determining, based on a character type of the target character, a first display parameter used for displaying the target character on a UI, the processor 701 performs the following operations: performing typesetting on the target character according to a typesetting rule corresponding to the character type of the target character; and determining the first display parameter corresponding to the target character according to the typeset target character and corresponding configuration information displayed in a floating manner.

In an embodiment, the target character includes a first character and a second character, and when performing typesetting on the target character according to a typesetting rule corresponding to the character type of the target character, the processor 701 performs the following operations: performing, when or in response to determining a first character type corresponding to the first character is the same as a second character type corresponding to the second character, typesetting on the first character and the second character according to an alignment rule indicated in a typesetting rule corresponding to the first character type or the second character type; and performing, when or in response to determining the first character type is different from the second character type, typesetting on the first character according to an alignment rule indicated in a typesetting rule corresponding to the first character type and typesetting on the second character according to an alignment rule indicated in a typesetting rule corresponding to the second character type.

In an embodiment, when performing typesetting on the first character according to an alignment rule indicated in a typesetting rule corresponding to the first character type and typesetting on the second character according to an alignment rule indicated in a typesetting rule corresponding to the second character type, the processor 701 performs the following operations: comparing a size of the first character with a size of the second character; performing, when or in response to determining the size of the first character is greater than the size of the second character, typesetting on the first character according to the alignment rule indicated in the typesetting rule corresponding to the first character type, and determining a height of the target character string according to a typesetting result; and performing typesetting on the second character based on the height of the target character string and the alignment rule indicated in the typesetting rule corresponding to the second character type.

In an embodiment, a second rendering parameter includes a character string image corresponding to the target character string and position information of the character string image, and when performing the second rendering preprocessing on the target character string to obtain the second rendered data set, the processor 701 performs the following operations: determining a second display parameter of the target character string based on corresponding configuration information displayed in a floating manner; generating a character string image corresponding to the target character string by using a character string image generation rule; adding the character string image corresponding to the target character string to a preset character rendering texture set to update the preset character rendering texture set, and determining position information of the character string image corresponding to the target character string in the updated character rendering texture set; and determining a second rendering parameter according to the character string image and the position information of the character string image in the updated character rendering texture set, and obtaining the second rendered data set according to the second rendering parameter and the second display parameter.

In an embodiment, a calling thread, parsing thread, and rendering thread are run on the terminal. The terminal invokes the calling thread to receive the character display instruction and detect the target character included in the target character string; the terminal invokes the parsing thread to perform the first rendering preprocessing on the target character included in the target character string to obtain the first rendered data set, and perform the second rendering preprocessing on the target character string to obtain the second rendered data set; and the terminal invokes the rendering thread to generate the rendering instruction according to the first rendered data set and generate the rendering instruction according to the second rendered data set.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

An embodiment of the present disclosure provides a computer program product or a computer program. The computer program product or the computer program includes computer instructions, and the computer instructions are stored in a computer-readable storage medium. A processor of a computing device reads the computer instructions from the computer-readable storage medium, and executes the computer instructions, so that the computing device performs the character string display processing method provided in the foregoing optional implementations. The computing device, which may alternatively be termed a computer device, may be a desktop and handheld computer.

A person of ordinary skill in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The foregoing storage medium may include a magnetic disc, an optical disc, a ROM, a RAM, or the like.

What is disclosed above is merely part embodiments of the present disclosure, and is not intended to limit the scope of the claims of the present disclosure. Therefore, equivalent variations made in accordance with the claims of the present disclosure shall fall within the scope of the present disclosure.

What is claimed is:

1. A character string display processing method, comprising:
   receiving a character display instruction, the character display instruction being used for instructing to render a character string set;
   performing, in response to determining a target character string in the character string set does not include a character of a preset type, first rendering preprocessing on a target character included in the target character string to obtain a first rendered data set, the first rendered data set including a target character image corresponding to the target character, and generating a rendering instruction about the character string set according to the first rendered data set to instruct to perform image rendering on the target character image; and
   performing, in response to determining the target character string in the character string set includes the character of the preset type, second rendering preprocessing on the target character string to obtain a second rendered data set, the second rendered data set including a character string image corresponding to the target character string, and generating a rendering instruction about the character string set according to the second rendered data set to instruct to perform image rendering on the character string image.

2. The method according to claim 1, wherein the character string set further includes another character string than the target character string, and
   the rendering instruction is further used for instructing, in response to determining the another character string does not include a character of the preset type, to perform image rendering on a character image corresponding to a character included in the another character string; and
   the rendering instruction is further used for instructing, in response to determining the another character string includes a character of the preset type, to perform image rendering on a character string image corresponding to the another character string.

3. The method according to claim 1, wherein performing the first rendering preprocessing comprises:
   determining, based on a character type of the target character, a first display parameter used for displaying the target character on a user interface (UI) in a floating manner;
   determining a first rendering parameter corresponding to the target character based on a preset character rendering texture set, the preset character rendering texture set including a character image corresponding to at least one character; and
   obtaining the first rendered data set according to the first display parameter and the first rendering parameter.

4. The method according to claim 3, wherein the first rendering parameter includes a target character image corresponding to the target character and position information of the target character image, and determining the first rendering parameter comprises:
   determining, in response to determining the character rendering texture set includes a character image matching the target character, the matched character image as the target character image corresponding to the target character, and determining the position information of the target character image according to a position of the matched character image in the character rendering texture set.

5. The method according to claim 4, wherein determining the first rendering parameter comprises:
   generating, in response to determining the character rendering texture set does not include a character image matching the target character, a target character image corresponding to the target character by using a character rendering image generation rule, and adding the target character image to the character rendering texture set according to a preset storage rule to update the character rendering texture set; and
   determining position information of the target character image in the updated character rendering texture set according to the preset storage rule as the position information of the target character image.

6. The method according to claim 5, wherein in response to determining the character image corresponding to the target character is obtained, the target character image corresponding to the target character is found according to the character code corresponding to the target character and an association storage relationship.

7. The method according to claim 3, wherein determining the first display parameter comprises:
   performing typesetting on the target character according to a typesetting rule corresponding to the character type of the target character; and
   determining the first display parameter corresponding to the target character according to the typeset target character and corresponding configuration information displayed in a floating manner.

8. The method according to claim 7, wherein the first display parameter of the target character includes vertex coordinates of the character image corresponding to the target character, and performing the first rendering preprocessing further comprises:
   combining, after all target characters included in the target character string are typeset, vertex coordinates of character images corresponding to all the target characters, and using the character images of all the target characters as an entire texture.

9. The method according to claim 7, wherein the target character includes a first character and a second character, and performing typesetting on the target character comprises:
performing, in response to determining a first character type corresponding to the first character is the same as a second character type corresponding to the second character, typesetting on the first character and the second character according to an alignment rule indicated in a typesetting rule corresponding to the first character type or the second character type; and
performing, in response to determining the first character type is different from the second character type, typesetting on the first character according to an alignment rule indicated in a typesetting rule corresponding to the first character type and typesetting on the second character according to an alignment rule indicated in a typesetting rule corresponding to the second character type.

10. The method according to claim 9, wherein in response to determining both the first character type and the second character type are text types, performing typesetting on the first character comprises:
performing typesetting on the first character and the second character according to the typesetting rule on a default baseline;
determining heights of under-baseline character patterns of the typeset first character and second character under the default baseline, and using a baseline corresponding to an under-baseline character pattern with the largest height as a baseline of the target character; and
determining heights of above-baseline character patterns of the first character and the second character above the default baseline, and a sum of a height of an above-baseline character pattern with the largest height and a height of the under-baseline character pattern with the largest height as a height of the target character.

11. The method according to claim 9, wherein in response to determining both the first character type and the second character type are image types, performing typesetting on the first character comprises:
performing typesetting on one character with the larger size in the first character and the second character first according to the typesetting rule;
calculating coordinates of a top left vertex of the other character according to a height of the character with the larger size, and performing typesetting on the other character according to the calculated coordinates of the top left vertex; and
determining a height of the character with the larger size in the two characters as a height of the target character.

12. The method according to claim 9, wherein performing typesetting on the first character comprises:
comparing a size of the first character with a size of the second character; and
performing, in response to determining the size of the first character is greater than the size of the second character, typesetting on the first character according to the alignment rule indicated in the typesetting rule corresponding to the first character type, and determining a height of the target character string according to a typesetting result; and
performing typesetting on the second character based on the height of the target character string and the alignment rule indicated in the typesetting rule corresponding to the second character type.

13. The method according to claim 1, wherein a second rendering parameter includes a character string image corresponding to the target character string and position information of the character string image, and performing the second rendering preprocessing comprises:
determining a second display parameter of the target character string based on corresponding configuration information displayed in a floating manner;
generating a character string image corresponding to the target character string by using a character string image generation rule;
adding the character string image corresponding to the target character string to a preset character rendering texture set to update the preset character rendering texture set, and determining position information of the character string image corresponding to the target character string in the updated character rendering texture set; and
determining a second rendering parameter according to the character string image and the position information of the character string image in the updated character rendering texture set, and obtaining the second rendered data set according to the second rendering parameter and the second display parameter.

14. The method according to claim 1, wherein a calling thread, a parsing thread, and a rendering thread are run on a terminal, and
the terminal invokes the calling thread to receive the character display instruction and detect the target character included in the target character string;
the terminal invokes the parsing thread to perform the first rendering preprocessing on the target character included in the target character string to obtain the first rendered data set, and perform the second rendering preprocessing on the target character string to obtain the second rendered data set; and
the terminal invokes the rendering thread to generate the rendering instruction according to the first rendered data set and generate the rendering instruction according to the second rendered data set.

15. The method according to claim 14, wherein at least the parsing thread and the rendering thread are asynchronous threads.

16. A character string display processing apparatus, comprising: a memory storing computer program instructions; and a processor coupled to the memory and configured to execute the computer program instructions and perform:
receiving a character display instruction, the character display instruction being used for instructing to render a character string set; and
performing, in response to determining a target character string in the character string set does not include a character of a preset type, first rendering preprocessing on a target character included in the target character string to obtain a first rendered data set, the first rendered data set including a target character image corresponding to the target character, and generate and transmit a rendering instruction about the character string set according to the first rendered data set, the rendering instruction being used for instructing to perform image rendering on the target character image,
performing, in response to determining a target character string in the character string set includes a character of a preset type, second rendering preprocessing on the target character string to obtain a second rendered data set, the second rendered data set including a character string image corresponding to the target character string, and generate a rendering instruction about the character string set according to the second rendered data set to instruct to perform image rendering on the character string image.

17. The apparatus according to claim 16, wherein when performing the first rendering preprocessing on the target character included in the target character string to obtain the first rendered data set, the processor is configured to execute the computer program instructions and further perform:

determining, based on a character type of the target character, a first display parameter used for displaying the target character on a user interface (UI) in a floating manner;

determining a first rendering parameter corresponding to the target character based on a preset character rendering texture set, the preset character rendering texture set including a character image corresponding to at least one character; and obtaining the first rendered data set according to the first display parameter and the first rendering parameter.

18. The apparatus according to claim 16, wherein a second rendering parameter includes a character string image corresponding to the target character string and position information of the character string image, and when performing the second rendering preprocessing on the target character string to obtain the second rendered data set, the processor is configured to execute the computer program instructions and further perform:

determining a second display parameter of the target character string based on corresponding configuration information displayed in a floating manner;

generating a character string image corresponding to the target character string by using a character string image generation rule;

adding the character string image corresponding to the target character string to a preset character rendering texture set to update the preset character rendering texture set, and determining position information of the character string image corresponding to the target character string in the updated character rendering texture set; and determining a second rendering parameter according to the character string image and the position information of the character string image in the updated character rendering texture set, and obtaining the second rendered data set according to the second rendering parameter and the second display parameter.

19. The apparatus according to claim 16, herein the character string set further includes another character string than the target character string, and the rendering instruction is further used for instructing, in response to determining the another character string does not include a character of the preset type, to perform image rendering on a character image corresponding to a character included in the another character string; and the rendering instruction is further used for instructing, in response to determining the another character string includes a character of the preset type, to perform image rendering on a character string image corresponding to the another character string.

20. A non-transitory computer-readable storage medium storing computer program instructions executable by at least one processor to perform:

receiving a character display instruction, the character display instruction being used for instructing to render a character string set;

performing, in response to determining a target character string in the character string set does not include a character of a preset type, first rendering preprocessing on a target character included in the target character string to obtain a first rendered data set, the first rendered data set including a target character image corresponding to the target character, and generating a rendering instruction about the character string set according to the first rendered data set to instruct to perform image rendering on the target character image; and performing, in response to determining the target character string in the character string set includes the character of the preset type, second rendering preprocessing on the target character string to obtain a second rendered data set, the second rendered data set including a character string image corresponding to the target character string, and generating a rendering instruction about the character string set according to the second rendered data set to instruct to perform image rendering on the character string image.

* * * * *